(12) United States Patent
Hoehnen et al.

(10) Patent No.: US 11,288,634 B1
(45) Date of Patent: Mar. 29, 2022

(54) RESOURCE MANAGEMENT SYSTEM

(71) Applicant: PROGRESSIVE CASUALTY INSURANCE COMPANY, Mayfield Village, OH (US)

(72) Inventors: Jason Hoehnen, Mayfield Village, OH (US); Sara Edwards, Mayfield Village, OH (US); Hassan Al Rawi, Mayfield Village, OH (US); Sharon Parks, Mayfield Village, OH (US); Dominic Valentino, Mayfield Village, OH (US); Allen Layne, Mayfield Village, OH (US)

(73) Assignee: PROGRESSIVE CASUALTY INSURANCE COMPANY, Mayfield Village, OH (US)

( * ) Notice: Subject to any disclaimer, the term of this patent is extended or adjusted under 35 U.S.C. 154(b) by 0 days.

(21) Appl. No.: 17/387,222

(22) Filed: Jul. 28, 2021

Related U.S. Application Data

(63) Continuation-in-part of application No. 17/232,339, filed on Apr. 16, 2021, which is a continuation of
(Continued)

(51) Int. Cl.
*H04L 29/06* (2006.01)
*G06Q 10/10* (2012.01)
(Continued)

(52) U.S. Cl.
CPC .......... *G06Q 10/103* (2013.01); *G06F 9/547* (2013.01); *G06F 16/242* (2019.01); *G06Q 20/085* (2013.01); *G06Q 30/0185* (2013.01); *G06Q 30/0611* (2013.01); *G06Q 30/0631* (2013.01); *H04L 9/085* (2013.01); *H04L 9/0894* (2013.01); *H04L 63/08* (2013.01); *H04L 63/102* (2013.01); *H04L 67/18* (2013.01); *G06Q 10/1093* (2013.01); *G06Q 10/20* (2013.01);
(Continued)

(58) Field of Classification Search
CPC ..... G06F 16/242; H04L 9/085; H04L 9/0894; H04L 63/08; H04L 63/102
USPC ......................................................... 726/26
See application file for complete search history.

(56) References Cited

U.S. PATENT DOCUMENTS 6,567,784 B2   5/2003   Bukow
6,829,584 B2   12/2004  Loveland
(Continued)

*Primary Examiner* — Longbit Chai
(74) *Attorney, Agent, or Firm* — Lempia Summerfield Katz LLC

(57) ABSTRACT

A system automatically manages remote and local data through a declarative client that retrieves, tracks, and caches data in response to a transmission from an interface. The declarative client accesses an immutable image served by a secure cloud platform. A serverless compute engine receives the immutable image and a plurality of tasks that process the immutable image in a container. An application programming interface in communication with the declarative client extracts data via queries from a database. The declarative client includes an in-memory cache that stores broken up results of the queries into individual objects that are each associated with a unique identifier. The extracted data is deconstructed downloaded content in which assigned links between data elements are mapped to redirected computer-generated links that locate the downloaded content.

20 Claims, 23 Drawing Sheets

Related U.S. Application Data application No. 16/998,614, filed on Aug. 20, 2020, now Pat. No. 10,997,559.

(51) Int. Cl.

| | |
|---|---|
| *G06F 16/242* | (2019.01) |
| *H04L 9/08* | (2006.01) |
| *G06Q 20/08* | (2012.01) |
| *G06Q 30/06* | (2012.01) |
| *G06Q 30/00* | (2012.01) |
| *H04L 67/52* | (2022.01) |
| *G06F 9/54* | (2006.01) |
| *H04W 4/12* | (2009.01) |
| *G06Q 40/00* | (2012.01) |
| *G06Q 10/00* | (2012.01) |

(52) U.S. Cl.
CPC ......... *G06Q 40/12* (2013.12); *G06Q 2220/00* (2013.01); *H04W 4/12* (2013.01)

(56) References Cited

U.S. PATENT DOCUMENTS

| | | | |
|---|---|---|---|
| 7,058,508 B2 | 6/2006 | Combs et al. |
| 7,096,193 B1 | 8/2006 | Beaudoin et al. |
| 7,487,111 B2 | 2/2009 | Shoen et al. |
| 7,516,103 B1 | 4/2009 | Peitrucha, Jr. et al. |
| 7,707,055 B2 | 4/2010 | Behmoiras et al. |
| 7,774,223 B2 | 8/2010 | Karabetsos |
| 7,835,928 B2 | 11/2010 | Schoenberg |
| 7,881,977 B2 | 2/2011 | Walker |
| 7,912,744 B2 | 3/2011 | Combs et al. |
| 7,958,042 B2 | 6/2011 | Burns et al. |
| 7,983,968 B1 | 7/2011 | Chase et al. |
| 8,010,430 B1 | 8/2011 | Chase et al. |
| 8,024,261 B2 | 9/2011 | Erbey et al. |
| 8,036,160 B1 | 10/2011 | Oakes, III |
| 8,046,263 B1 | 10/2011 | Linn |
| 8,135,627 B2 | 3/2012 | Shoen et al. |
| 8,190,732 B1 | 5/2012 | Cooley et al. |
| 8,271,326 B1 | 9/2012 | Brunet et al. |
| 8,290,801 B1 | 10/2012 | Roach, Jr. et al. |
| 8,301,478 B2 | 10/2012 | Agrawal |
| 8,346,582 B1 | 1/2013 | Davis et al. |
| 8,346,624 B2 | 1/2013 | Goad et al. |
| 8,370,235 B1 | 2/2013 | Chase et al. |
| 8,412,618 B2 | 4/2013 | Robertson et al. |
| 8,433,617 B2 | 4/2013 | Goad et al. |
| 8,478,659 B2 | 7/2013 | Behmoiras et al. |
| 8,533,019 B2 | 9/2013 | Agrawal |
| 8,612,262 B1 | 12/2013 | Condon et al. |
| 8,738,727 B2 | 5/2014 | Schoenberg |
| 8,825,736 B2 | 9/2014 | Agrawal |
| 8,838,504 B2 | 9/2014 | Eraker et al. |
| 8,838,751 B1 | 9/2014 | Scofield et al. |
| 9,129,326 B2 | 9/2015 | Agrawal |
| 9,349,121 B2 | 5/2016 | Green |
| 9,400,845 B2 | 7/2016 | Damelia |
| 9,426,293 B1 | 8/2016 | Oakes, III |
| 9,436,945 B2 | 9/2016 | Eraker et al. |
| 9,449,040 B2 * | 9/2016 | Gupta ................ G06F 11/1446 |
| 9,800,676 B2 | 10/2017 | Lee |
| 9,852,447 B2 | 12/2017 | Eraker et al. |
| 9,970,675 B2 | 5/2018 | Quam et al. |
| 10,002,398 B1 | 6/2018 | Isaacson |
| 10,007,942 B2 | 6/2018 | Wickam |
| 10,042,341 B1 | 8/2018 | Jacob |
| 10,043,206 B2 | 8/2018 | Zamer et al. |
| 10,083,411 B2 | 9/2018 | Kinsey, II et al. |
| 10,116,755 B2 | 10/2018 | Kim et al. |
| 10,122,671 B2 | 11/2018 | Donahoe et al. |
| 10,157,412 B2 | 12/2018 | Tolia et al. |
| 10,171,670 B1 | 1/2019 | Oakes |
| 10,262,375 B1 | 4/2019 | Howard |
| 10,334,077 B2 | 6/2019 | Loynd et al. |
| 10,402,760 B2 | 9/2019 | Kinsey, II |
| 10,489,745 B1 | 11/2019 | Verroios et al. |
| 2009/0192854 A1 | 7/2009 | Pietrucha, Jr. et al. |
| 2009/0254572 A1 * | 10/2009 | Redlich .................. G06Q 10/06 |
| 2015/0001930 A1 | 1/2015 | Juntunen et al. |
| 2015/0127174 A1 | 5/2015 | Quam et al. |
| 2016/0164310 A1 | 6/2016 | Juntunen et al. |
| 2018/0003744 A1 | 1/2018 | Juntunen et al. |
| 2018/0225713 A1 | 8/2018 | Eraker et al. |
| 2019/0066840 A1 | 2/2019 | Schoenberg |
| 2019/0139115 A1 | 5/2019 | Wickam |
| 2019/0171743 A1 * | 6/2019 | Ding .................... G06F 16/217 |
| 2019/0268443 A1 | 8/2019 | Loynd et al. |
| 2019/0347717 A9 | 11/2019 | Erbey et al. |

\* cited by examiner

RESOURCE MANAGEMENT SYSTEM

PRIORITY CLAIM

This application is a continuation-in-part application of U.S. Ser. No. 17/232,339, filed Apr. 16, 2021, which is a continuation of U.S. Ser. No. 16/998,614, which is now U.S. Pat. No. 10,997,559, which are incorporated herein by reference.

BACKGROUND OF THE DISCLOSURE

1. Technical Field

This disclosure relates to structural management, and specifically to systems that methods that manage big data.

2. Related Art

Resource coordination is challenging. Some processes attempt to provision materials and services but fail to assimilate them into a holistic resource. Some processes attempt to provide access to materials and some attempt to provide access to the skills needed to process them. These systems attempt to provision access via separate front-facing software.

Known processes attempt to manage access to a resource without managing the screened and vetted professionals that install them. Such systems fail to efficiently process large data associated with these resources and services. They cannot manage multiple resources and the large data associated with them. As such, it is difficult to track progress and establish measurable objectives making the monitoring processes meaningless. Adaptability and flexibility is a challenge for these systems, as many are custom-made and personalized to different end-users.

DETAILED DESCRIPTION

The disclosed resource management systems provide rich visualizations. The systems streamline processes across selections, procurement, and services using intelligent caching and proxies that simplify managing remote resources and large data. The systems generate graphically rich interactive screens that dynamically render project information over time through invisible mappings while guaranteeing financial commitments. The mappings establish associations between resource addresses for remote sources and remote destinations to local sources through intelligent caches and proxies. The invisible mappings re-direct what is usually served by remote sources via external requests to local sources. The systems create the impression that content is served independently through containers and computer framing, without the delay and bandwidth consumption that usually comes with such technology.

The systems provide alerts and status indicators while providing observations that end-users make electronically. In operation, some end-users have access to projects in their domain through desktop software and/or mobile apps by the system's knowledge of its users. When access is granted, end-users coordinate services, enter observations, request assessments, establish analytics, track outcomes, track quality, and receive guarantees.

To access objects that render content, connections are usually made between remote resources and local interfaces via remote requests and responses. Establishing network connections for each request/response for materials and services consumes network bandwidth and causes delay as many data exchanges must occur before a request can be serviced. Further, when content must be collected from multiple remote resources, some resources include deep links that contain the memory location (address) of embedded content that may be served outside of the network domain. Some linked content is served by remote resources that redirects the user to compromised external environments not served by the intended-origin server and/or network. Such link surfing may violate a same-origin server policy and/or a common domain security policy that some enterprise systems require. Subjecting users to domains outside of their demilitarized zones can cause bottlenecks that cause some origin severs to stop responding to user requests while waiting for remote responses.

Figure 1:
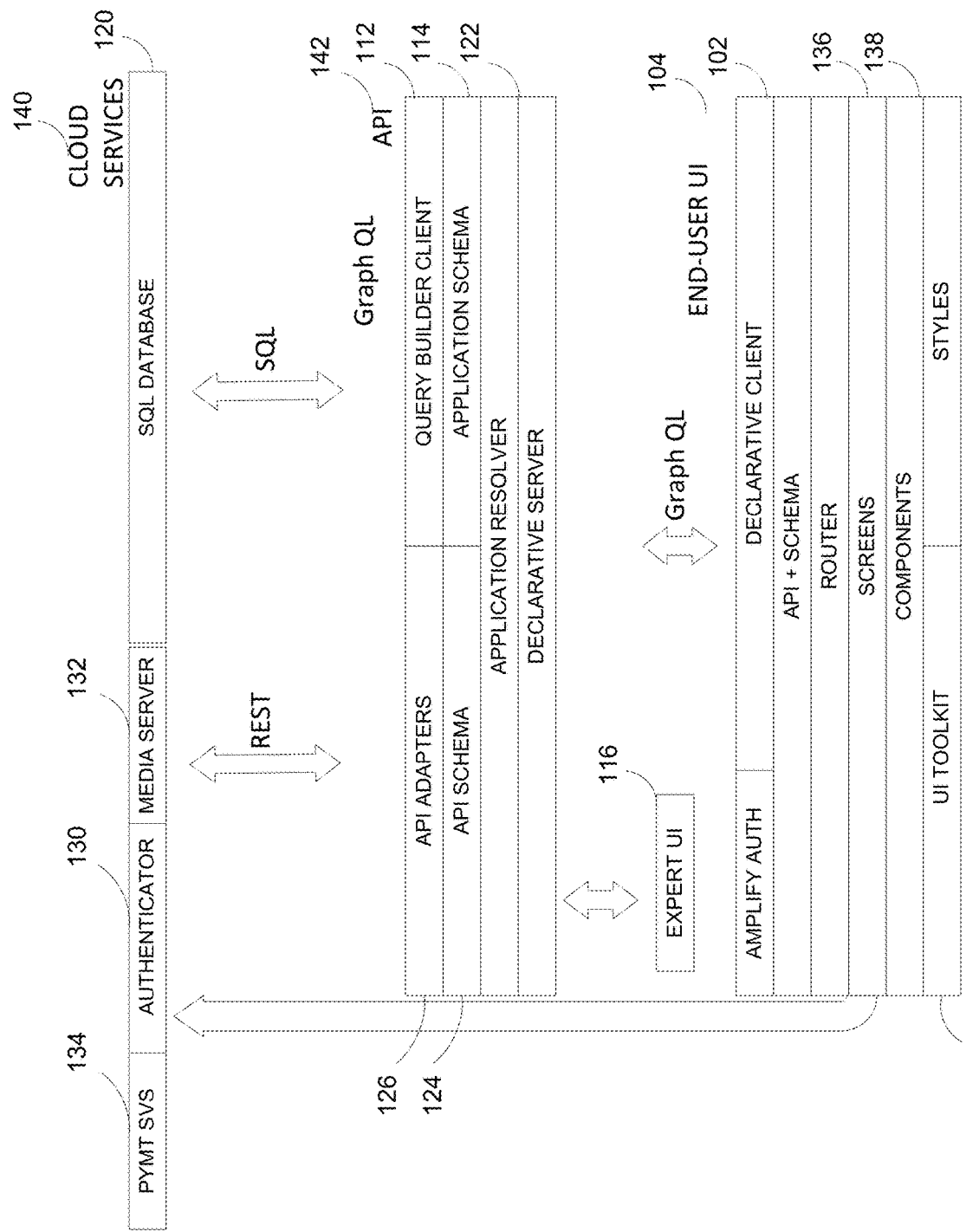
FIG. 1 is a system diagram of a resource management system architecture.

Rather than requiring end-users to access multiple remote external resources when managing desired resources, the nationwide resource management system of FIG. 1 uses a declarative client 102 for data fetching, data retrieving, load tracking, error rate tracking, caching, and updating end-user and expert interfaces 104 and 116. When an end-user's interface 104 request hits an application server through a secure transfer protocol such as a secure version of Hypertext Transfer Protocol (HTTPS), for example, a load balancer distributes the network traffic across multiple servers and/or server clusters. The request originates from the primary stack that requests services from the resources required to run and service an application. The resources may include a Web server, a database, and networking rules. Using a JavaScript library that supports the end-user interfaces such as a React-based web user interface-framework, the systems serves end-user interfaces (UIs) through UI components and guidelines directed to many components from interface layouts to language selections through a UI Toolkit 110 shown in FIG. 1. The systems provide several layout components including those based on a Flexible Box Module or flexbox that may serve as a dimensional layout module that provides accessibility, modularity, responsiveness, and theming and further reflects color selections, option type selection, and layouts. An exemplary React-based framework uses grommet in some alternate processes.

The application programming interface (API) that comprises a set of software routines used by the declarative client 102 is a graphical API. The declarative client 102 uses a normalized, in-memory cache to dramatically speed up the execution of queries. The cache normalizes the query results before saving them to memory by splitting results into individual objects, assigning unique identifiers to each object, and storing the objects in a flattened data structure associated with their unique identifiers in memory. A flattened data has no hierarchical order with no two files having the same name even in different directories. A unique identifier may combine the objects' names with a sequential operator designation and/or identifier and/or may specify the objects' path with the associated query. The in-memory cache is a device used to store data temporarily and deliver data at a rate faster than the rate the data is received. It improves system performance by reducing the number of times the declarative client 102 must go through the relatively slow process of reading from and writing to a conventional memory.

The declarative client 102 sits on or accesses immutable images that are served by Web services, like a secure private cloud service platform 140. The immutable images are different from computer snapshots as once they are made, they do not change. In other words, once images are formed, they can be deleted but cannot be modified. This ensures that once an image is created for an application, such as a home repair services app or a web home repair service app, for example, the working instances of the image won't break because of various modifications. If shared, the image functions as a new virtual home repair service application machine using the immutable image. The new machine will run like the original machine. In this architecture, images are analogous to templates, in which containers are built. Some containers run the images with a writable layer on top of the immutable image, meaning the system can modify the image only within the virtual walls of the container. In some systems, the declarative client 102 sits on Docker images that are served by secure cloud services 140 that includes database storage 120.

To avoid provisioning and managing server services, an abstraction layer in the form of a serverless compute engine process the containers that are used to access backend databases through middleware. At the core of the compute engine is a runtime API (not shown) that receives the images and tasks for the containers to process. The system creates a task definition based on the selected images, determines the CPU shares (e.g., the portion of the central processing unit allocated to the project), memory requirements, environment variable, entry point and command line arguments. Once a task is scheduled, a service API (not shown) is invoked that runs and maintains the desired number of tasks. Once processed, an application load balancer routes the processed traffic to the desired middleware port of the middleware stack.

Figure 19:
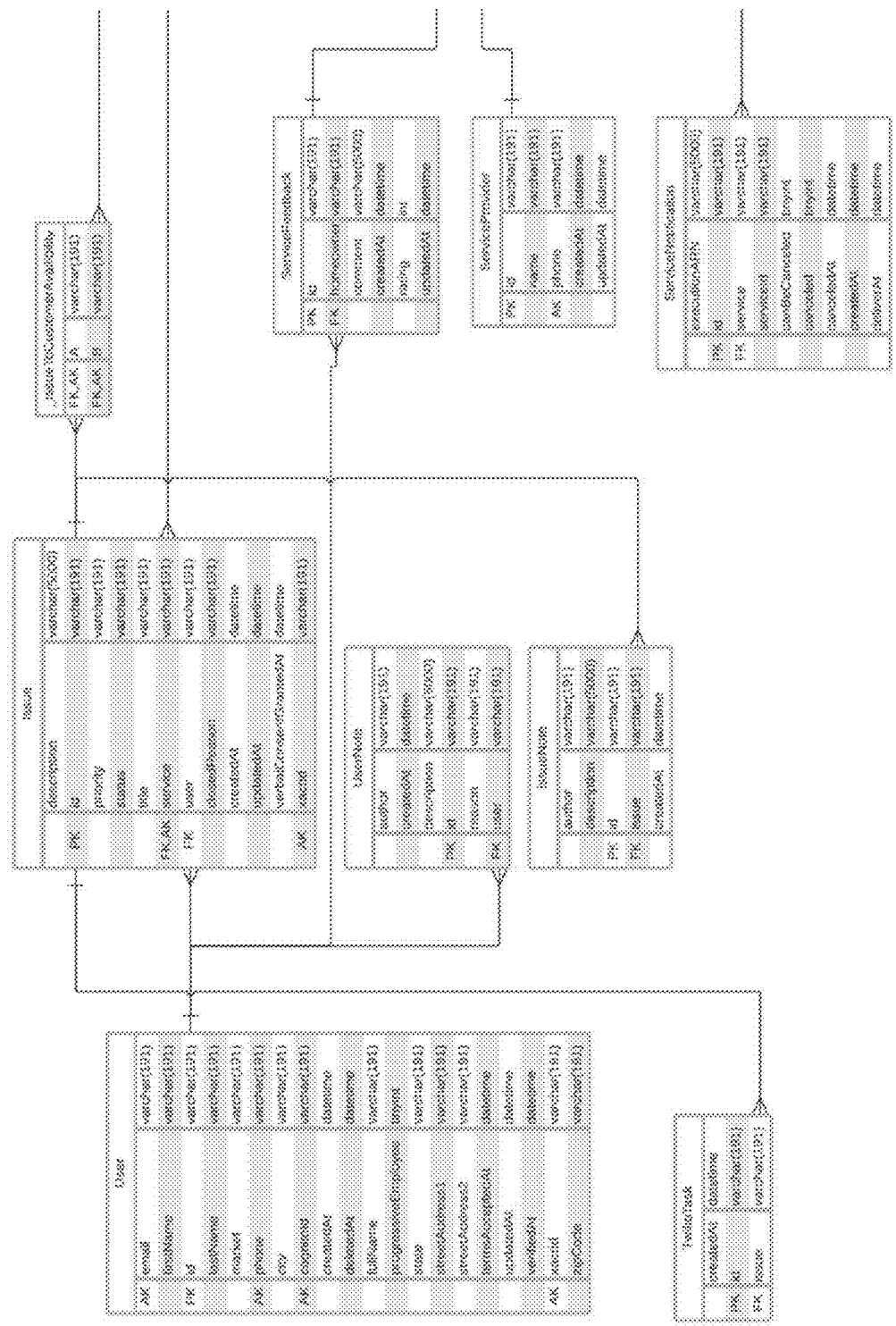
FIGS. 19 and 20 show an exemplary database schema.
Figure 20:
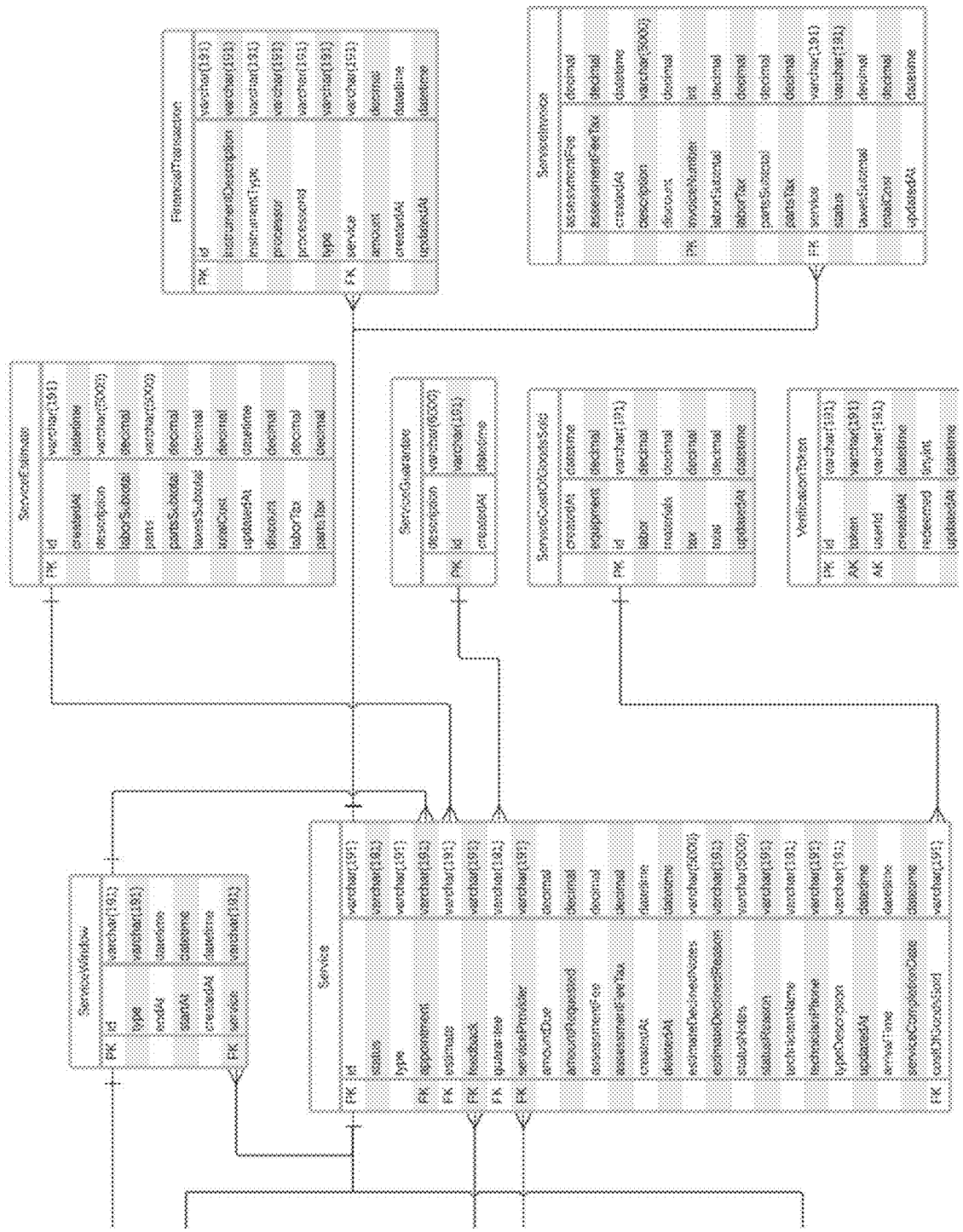

Using a database toolkit, an auto-generated query builder client 112 is created that resides in the middleware stack. The auto-generated query builder client 112 uses a schema 114 that defines the application models in a data model language. The connection to a database is used to form the query generator client 112. The schema allows the resource management experts and/or engines that access the resource management system via an expert user interface 116 to define the relationship fields without revealing the keys in the underlying database 120. In the application schema 114, a resource management expert or expert engine specifies the database connection through an environment variable and a data model that defines the application models, such as the exemplary connections shown in FIGS. 19 and 20. In operation, the data models are a collection of models that represent entities of an application model. The models have two functions. The first is to represent the desired underlying relationships between the objects stored in database 120 and the second is to provide a foundation for the queries executed by the auto-generated query builder client 112. The middleware may include enterprise level security through a resolver API 122, application schemas 124, and API adapters 126. The API adapters 126 create a virtual web service on a defined port that responds to Web requests.

The auto-generated query builder client 112, like the declarative client 102, renders queries that resemble a GraphQL service in FIG. 1, making the stack exchanges more graphical from top to bottom. Once the simulated GraphQL service is running, the SQL stack in the database services receives the GraphQL queries which it validates and executes. The SQL stack processes the received query to ensure it only refers to the type of fields defined in the relational database management system 120. It then runs the provided functions and renders a result.

Figure 2:
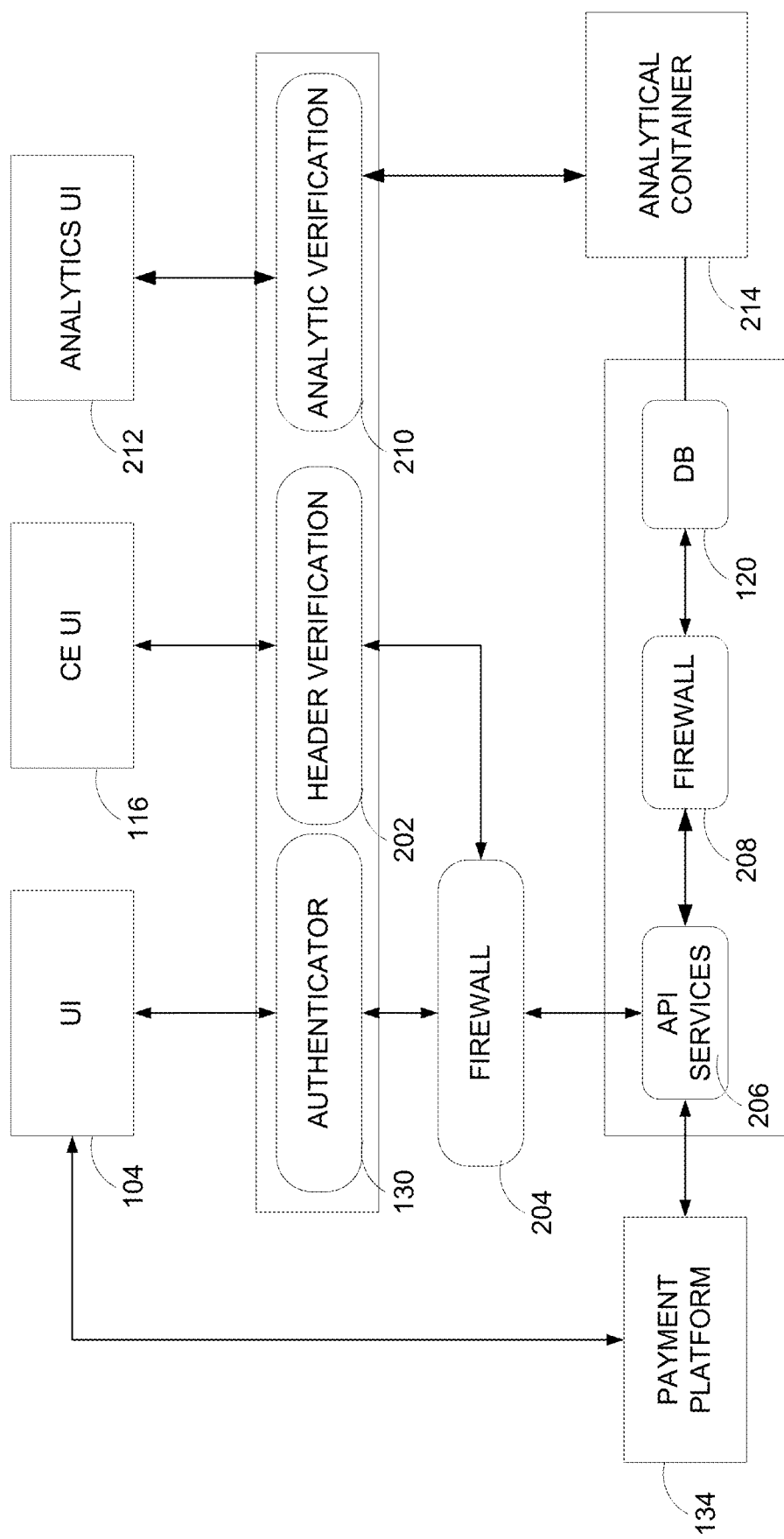
FIG. 2 is a system diagram of a resource management system authentication systems and transaction platform.
Figure 3:
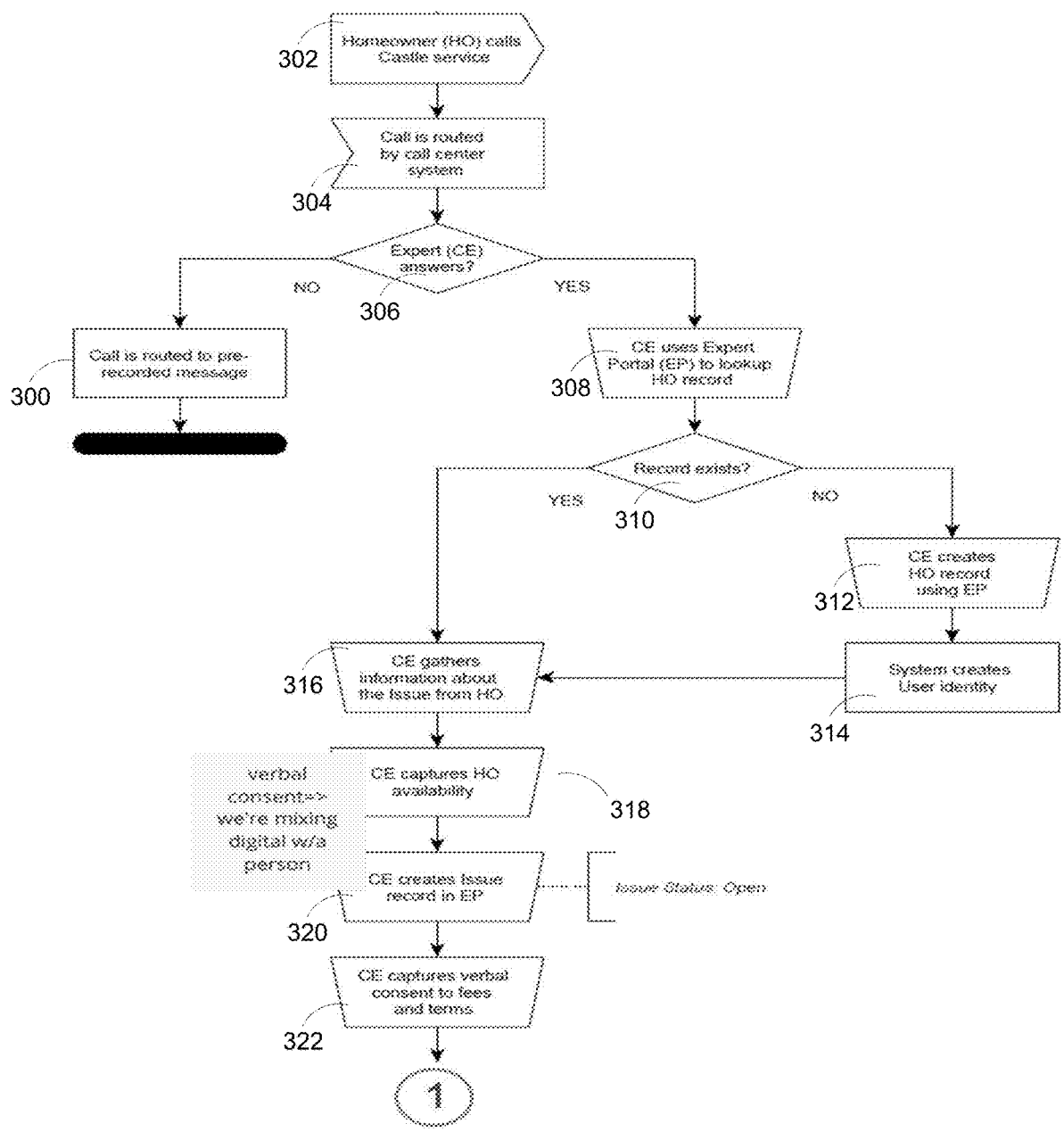
FIGS. 3-7 are process flows of an exemplary turnkey home repair process executed on a resource management system.
Figure 4:
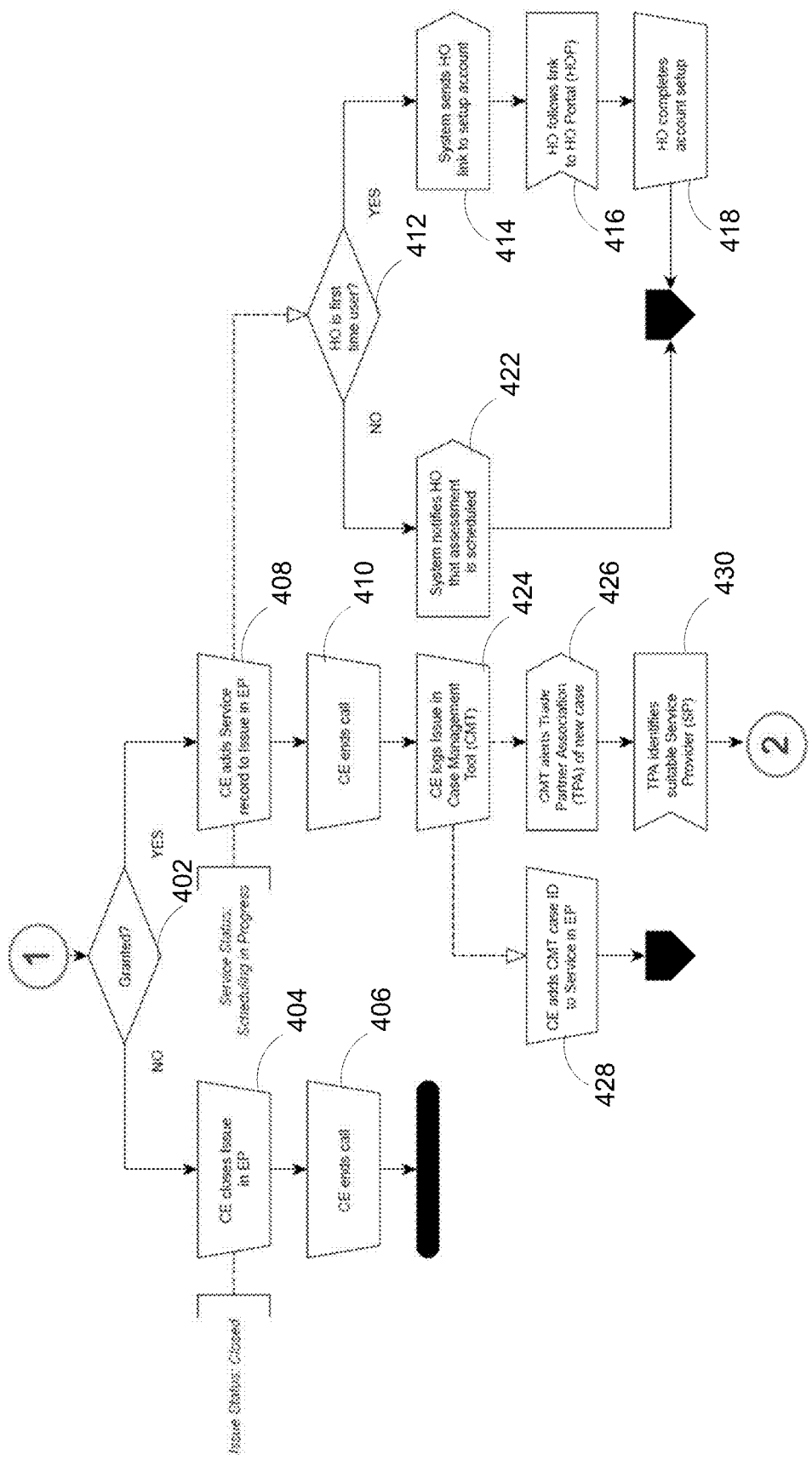
Figure 5:
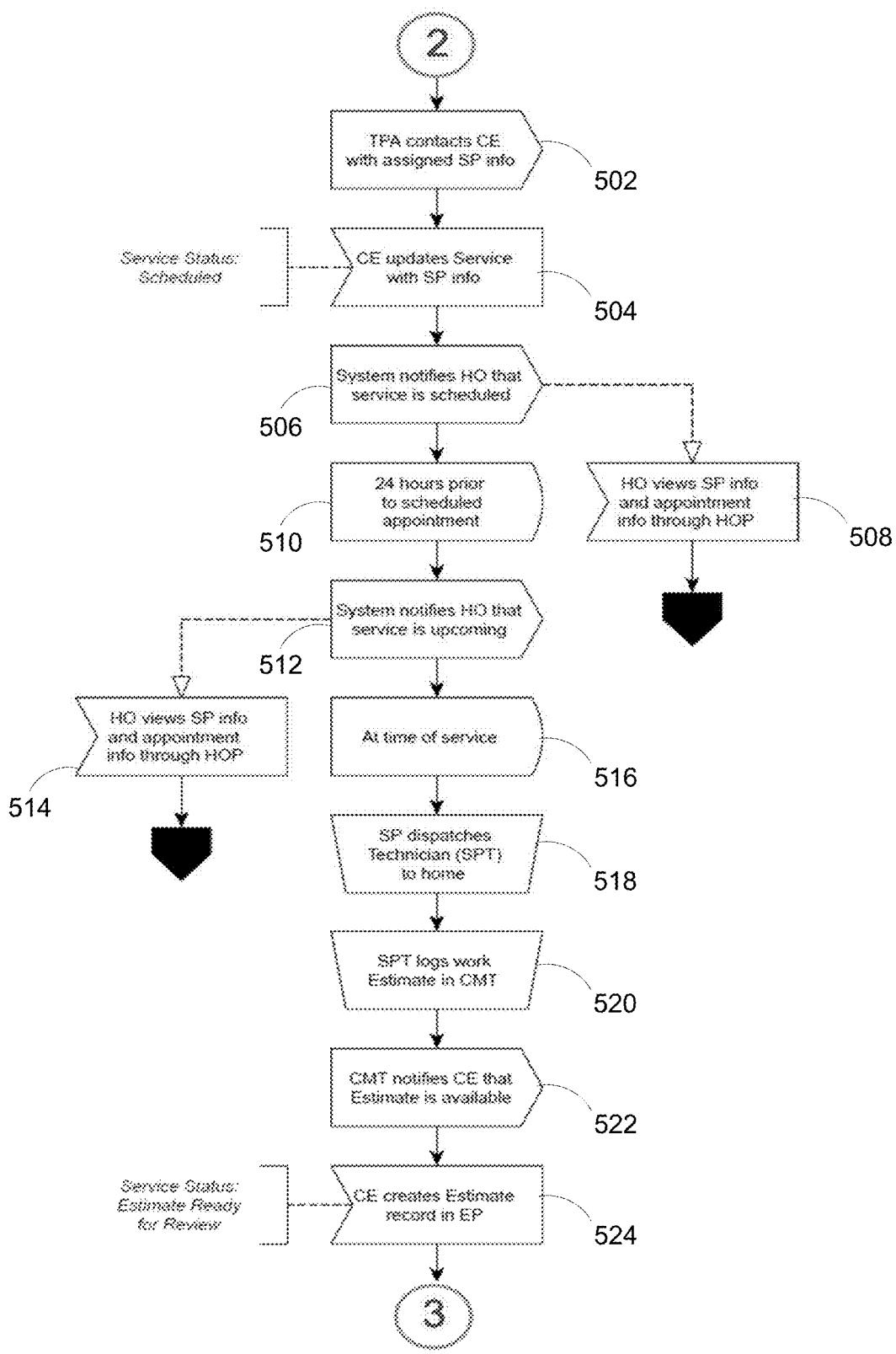

Access to the resource management system is provided through authentication and authorization servers 130, shown as an authenticator server in FIG. 2. The authentication is created for each end-user, which may include a project requester, a service expert, and/or an expert system. The systems allow end-users to access the resource management system at the security level at which they are assigned. For example, an end-user at a restricted security level, may access the resource management system through a web portal via an application only defined by the UI Toolkit 110 and a set of declarative client 102 GraphQL APIs. The GraphQL APIs are served by a database that are also constructed around GraphQLs.

The resource management system may also serve voice, video, and messaging through a software layer via a server 132 that connects, optimizes, captures, and records external communications, as shown in FIG. 1. Through software developer kits (SDKs) and voice APIs, and Web and mobile clients, end-users may reach the resource management system and resource management experts/engines as they are needed. A real-time audio and/or video infrastructure and audio and/or video SDKs embed video collaboration and context-sharing into resource management system, with the underlying infrastructure handling signaling, registration, recording, and media relay. Messaging APIs and messaging SDKs send and receive short message services (SMS), multimedia messages (MMS), and IP messages globally from Web and mobile apps, and use intelligent delivery features to ensure messages are received by the resource management experts.

A full-stack payment platform 134 serves payment services to the resource management system, as shown in FIG. 2. The payment platform 134 replaces the usual models of outsourcing payments to different gateways and merchant accounts, from a single-touch payment action via an app and/or browser to mobile SDKs. In operation, an end-user interacts and authenticates with the resource management system while interacting directly with the payment platform 134. When the end-user is ready to make a payment, the resource management system directs the end-user to the full-stack payment platform 134 that runs on servers or clusters (the term "server(s)" used in this disclosure collectively refers to server clusters) that are separate and remote from the resource management system and clusters. The resource management system directs the end-user's application and/or interface, such as browser request, for example, to the required authorized payment platform 134. Thereafter, the required authorization is pushed to the full-stack payment platform clusters 134 that process the payment internally or through vendor payments services and creates and pushes a payment token to the end-user UI 104, which payment is drawn against. A token comprises a nonreducible unique data structured element (e.g., the nonreducible nature maintains and ensures financial security) that describes the payment status that is usually parsed. In some systems, it comprises a textual element. The separation between the resource management system and a stand-alone payment platform 134 reduces the need to migrate users to new platforms, assures interoperability with older legacy systems, and allows the resource management system to accept and process input intended for later system versions (e.g., forward compatibility).

When a payment token issues, it passes through authentication and authorization servers 130 (described below), a firewall 204, and API servers 206, when it is pushed by the end-user interface 104. When an end-user authorizes payment, the resource management system queries the end-user interface 104 for the payment token and additional information, such as information relating to case identifiers and descriptions about the tasks associated with them. The resource management system further transmits a request for payment with the token directly to the payment platform 134 without passing it through intermediate components. Thereafter, the payment platform 134 validates the token. If successful, the transaction is completed and the additional information is stored in a resource management system database 120 (also referred to as the SQL database as it may reside there too). This allows the transaction to be correlated with other transactions. If a transaction fails or is later rejected, the failed payment is mediated to resolve the failure. Since payments are subject to charge backs and disputes, the payment status record in the (Removable Storage Manager) RSM database 214 is not recorded as a permanent status. Instead, it reflects the end-user's current payment state. Instances of the RSM database may comprise a standalone database 214 and/or a standalone database stored in an analytical container as shown in FIG. 2 or may reside within or link to the SQL database 120, and thus the RSM database may be associated with reference numbers 120 and/or 214. In some systems the RSM database contains information about the data stored in the resource management systems and may include library files, configuration state, user requests, etc. In some systems, the RSM database comprises a standalone or integrated database that manipulates stored information in a logical, natural, and easy to use architecture. The database conducts searches through data-finding routines and predetermined rules governing associations, relationships, and inferences regarding the data like an intelligent database.

When an end-user logs onto the resource management system, the user's credentials are compared to credential data maintained in the user profile in the authentication and authorization servers 130. The authentication and authorization servers 130 collect a user's profile attributes into directories called user pools that the user's mobile app or web app processes to configure their accessibility rights to the resource management resources. An identity pool consolidates end-user information, which client access platforms, devices and operating systems access from identity groups. Data synchronizes with the resource management system when an end-user's device is online, allowing an end-user to access the same information on another device without moving or entering that same information into that device. Data can also be saved in a database, such as the RSM database 120, while offline before reconnecting to the computer network. The authentication system servers associate data sets with identities and saves encrypted information in the form of cryptographic keys or value pairs that are part of an API key authorization header stored in a synchronization store (not shown) in the resource management system and validated by the header verification servers 202.

By accessing a plurality of device profiles stored in the screen layer 136 of the server cluster 108, some alternate resource management systems also deliver content to most device profiles, form factors, and/or device functionalities by identifying unique combinations of characteristics and capabilities that differentiate devices from other devices through device profile comparisons and matching. By combining device data with situational information about the user, such as, for example, the user's/expert's location (e.g., the user's/service provider's device location provided through global positioning data rendered by navigation systems resident to user's/service provider's device), IP connections, network connection speeds, and/or prior use identifiers that are stored in the user's/service provider's device profile and/or SQL database 120, some alternate authentication and authorization servers 120 confirm user identities by making device profile comparisons at the alternate authentication and authorization servers 120 as a second form of authentication rendering a two-way authentication. The two-way authentication comprises an alternate embodiment. Once a user and/or device is identified and authenticated, the data delivered is configured to the device's form factor. Some server clusters 108 tailor the data and/or functions that the resource management system provides to the identified and authenticated device's capabilities.

Once an end-user and/or device is authenticated by the authenticator servers 130, a user session is initiated and the user's requests are passed through a firewall 204 before they hit the API servers that provide API services 206. The API servers 142 communicate with the RSM database 120 through a second firewall 208. API servers 142 and instances of the RSM database 120 do not touch any publicly accessible networks like the Internet. Resource management experts and/or automated engine access is gained through an API key authorization header that is previously assigned in some systems that is validated by the header verification servers 202, and thus does not require validation by the authenticator servers 130.

A finance and accounting interface 212 allows the resource management system to track finance and execute analytics. The resource management system provides access to system data through instance of the RSM database 120 served via an analytical container 214 that is updated at batched periodic time intervals or at a scheduled time intervals.

The resource management system has many uses, including serving web home repair service apps that provide access to resources through landlines, mobile devices and WebRTC clients. In the exemplary use case shown in FIGS. 3-7, an end-user, such as a homeowner, calls into a call center or network portal at 302 and 304. The call is routed to a resource management expert and/or fully automated expert engine (expert engine), which in this exemplary home repair service app process are referred to as a Castle Expert (CE). Through another network portal, the CE accesses the home-owner's records at 306 and 308. If the CE is unavailable, the communication triggers a response at 300 and if homeowner's records cannot be found at 310, the CE collects the homeowner's profile attributes through an expert portal (EP) at 312. The attributes are processed to create the end-user's identity and the homeowner's user pool at 314. At 316 and 318, the CE harvests information about the issue to be addressed. The resource management system also captures the homeowner's availability via availability windows capturing calendar dates and time periods in which the homeowner is available, and when the issue is accessible, and creates a record through the EP that is retained in a memory at 320. At 322 and 402, the resource management system solicits the homeowner's verbal acceptance of an onsite assessment and its corresponding inspection and assessment fee. If the homeowner declines, the CE closes the issue via the EP and terminates the call at 404 and 406. If the offer is accepted, the resource management system generates a service record and thereafter terminates the call at 408 and 410.

If the homeowner is a first-time user, the system transmits an address and a protocol to be used to access the system via a user-actuated link at 412-416. The protocol includes a set of rules that enable the homeowner to connect to the resource management system and exchange information automatically. Once connected, the end-user (the homeowner) completes the account set up at 418. If the end-user is not a first-time user, homeowner recognition triggers the notification that an assessment is scheduled at 422.

With the details of the issue logged into a service record via case management tools (CMT), the CE adds a CMT case identifier to the expert portal and transmits an alert to a trade partner association engine of the new case at 424-426. The trade partner association engine identifies and assigns one or more suitable screened and vetted service professionals (SP) and transmits SP data to the CE EP portal, at which the system transmits a notification of the scheduled service to the homeowner at 430, and 502-506 in FIGS. 4 and 5. The notification may comprise a SMS, text message, and/or email with a computer link that identifies the scheduled service, that when activated at 508, prompts the homeowner to enter a password, which advances the web home repair services app to a summary page. At a predetermined time before the scheduled service is to be performed, the resource management system transmits a reminder to the web home repair services app at 510-514. Like the notification, the reminder may comprise a SMS, text message, synthesized voice, and/or email with a computer link that identifies the scheduled service that when activated, advances the web home repair services app to a summary page. In some systems, the reminder is automatically generated from the repair service app too, and provides the homeowner with an asynchronous notification without web access. At the time of service, the SP dispatches a service provider technician (SPT) to the home at 516 and 518 to render an estimate.

Some systems use a secure two-way portal to communicate with SP and SPTs. This portal allows CE to send and receive secure messages, documents, and estimates. When an assignment event occurs via the portal, the system enter time/date stamps, which thereafter occurs automatically at each milestone event. The assignment event is routed to an SP and thereafter an SPT. Some portals designate SP and SPT availability through unique geographic identifiers. The system is capable of tracing SP and SPT availability. When an assignment event occurs, the system serializes the input with a time/date stamp and/or an identifying number or reference with a time/date stamp. When the SP accepts the assignment, the system records a second time/date stamp to record the event. When an SP rejects an assignment event or a predetermined amount of time passes without an acceptance, the system automatically withdraws the SP delegation and transmits it to another SP. Assignment events include a statement that specifies the transmission protocol and an identifying number associated with the assignment and a preformatted estimate template. Some estimate templates include guardrails based on system practices that are customized to a desired application. Some assignment events include content, such as a recommended price list based on a geographic area, that are modified periodically. When the assignment is delegated, the inspection date, start/finish dates, and estimates are upload timestamped. The SPT enters an estimate through the CMT, which causes the resource management system to transmit a notification to the CE and results in an estimate record in the EP at 516-524.

Figure 6:
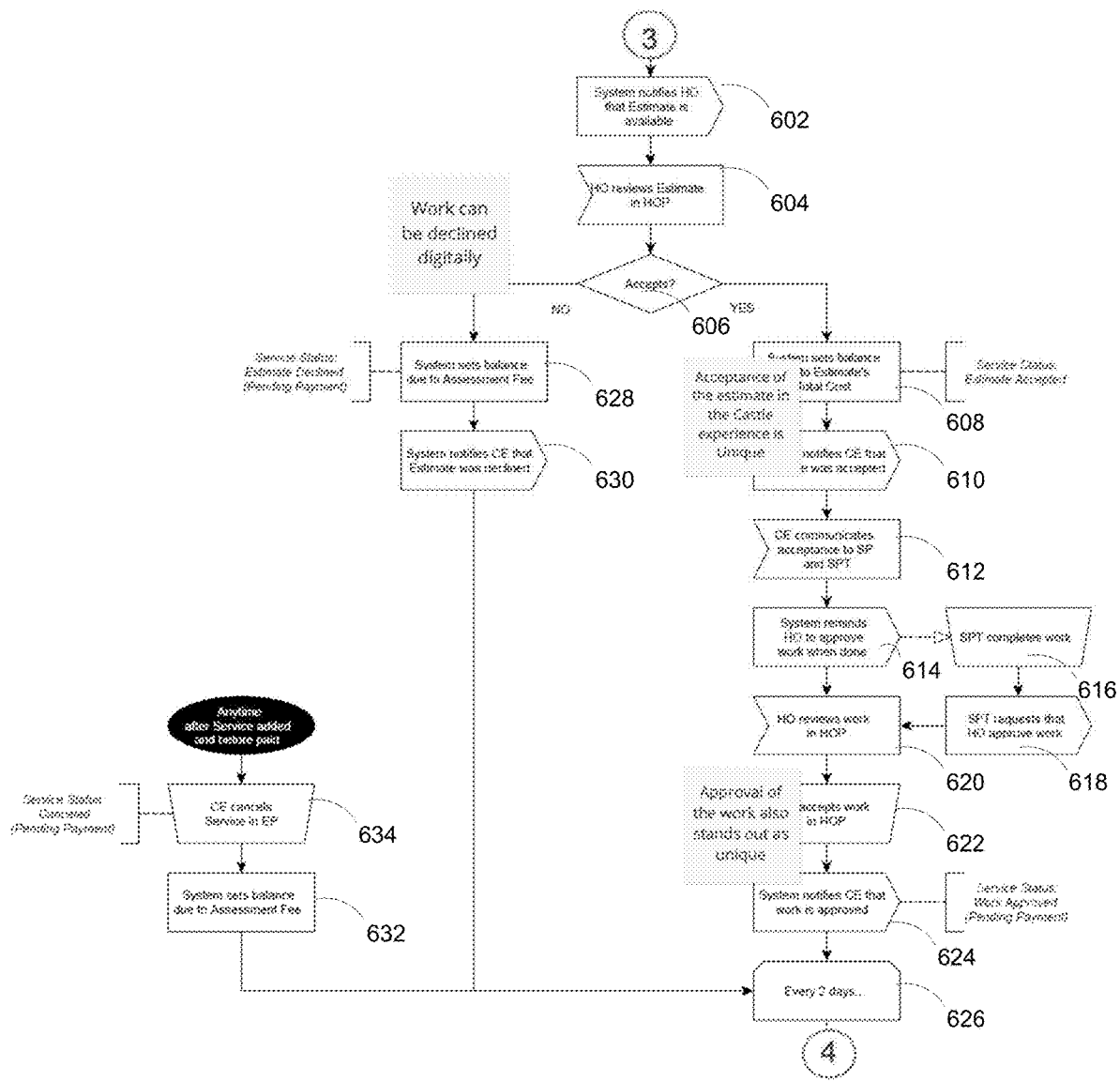

In response to the creation of the estimate record, the resource management system transmits a notification and secure document to the homeowner that facilitates a review and an electronic acceptance of the estimate at 602-606 in FIG. 6. The resource management system eliminates the need for the end-user (here, the homeowner) to print, sign, and return physical documents using known document acceptance practices. Instead, some resource management systems grant access to the secure document via a shared cryptographic secret that grants access to the document, and electronically signing by clicking (e.g., actuating) on a secure e-signature button. A shared secret comprises cryptographic data, known only to the parties involved, in a secure communication. In some alternate resource management systems, the clicking on the secure e-signature button redirects the end-user (e.g., the homeowner) to a secure website through a combination of hypertext transfer protocol (HTTP) and a secure socket layer (SSL)/transport layer security (TLS) that confirms the end-user's signature and automatically triggers an email and/or text message to the end-user and CE portal. As a result, the most recent version of the executed agreement is stored in the RSM database 120/214 for future retrieval.

Acceptance (e.g., acceptance via electronic means) of the estimate triggers the resource management system to calculate the balance due, notify the CE of the acceptance, and trigger one or more automatic communications (e.g., an SMS, email, etc.) of the acceptance to the designates SP and SPT and a communication to the homeowner to approve the work when it is completed, which triggers a CE notification at 608-624. Rejection of the offer triggers the resource management system to set an assessment fee, transmit a notification of the rejection to the CE, cancel the estimated services, and calculate open balances at 628-634.

Figure 7:
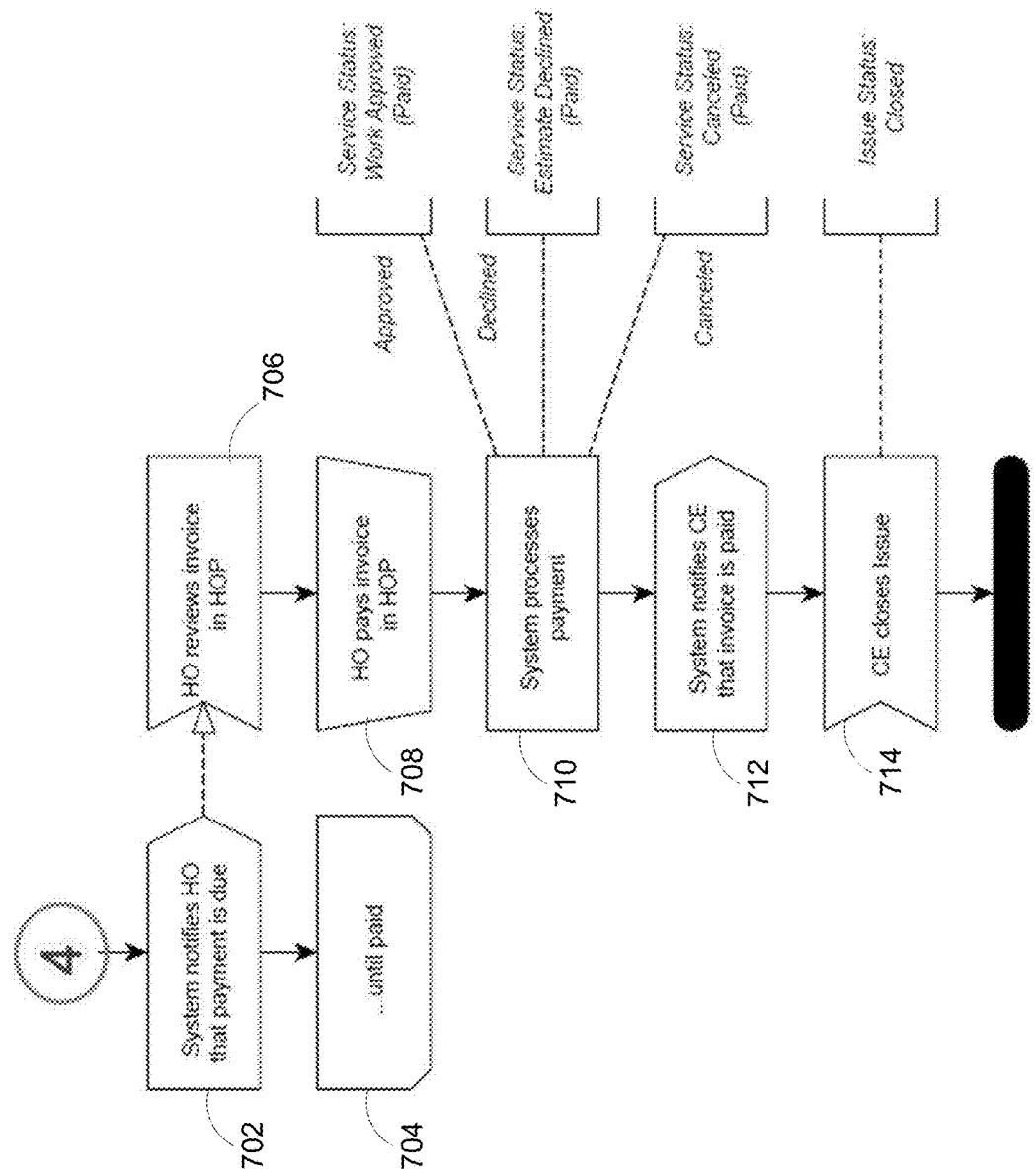
Figure 8:
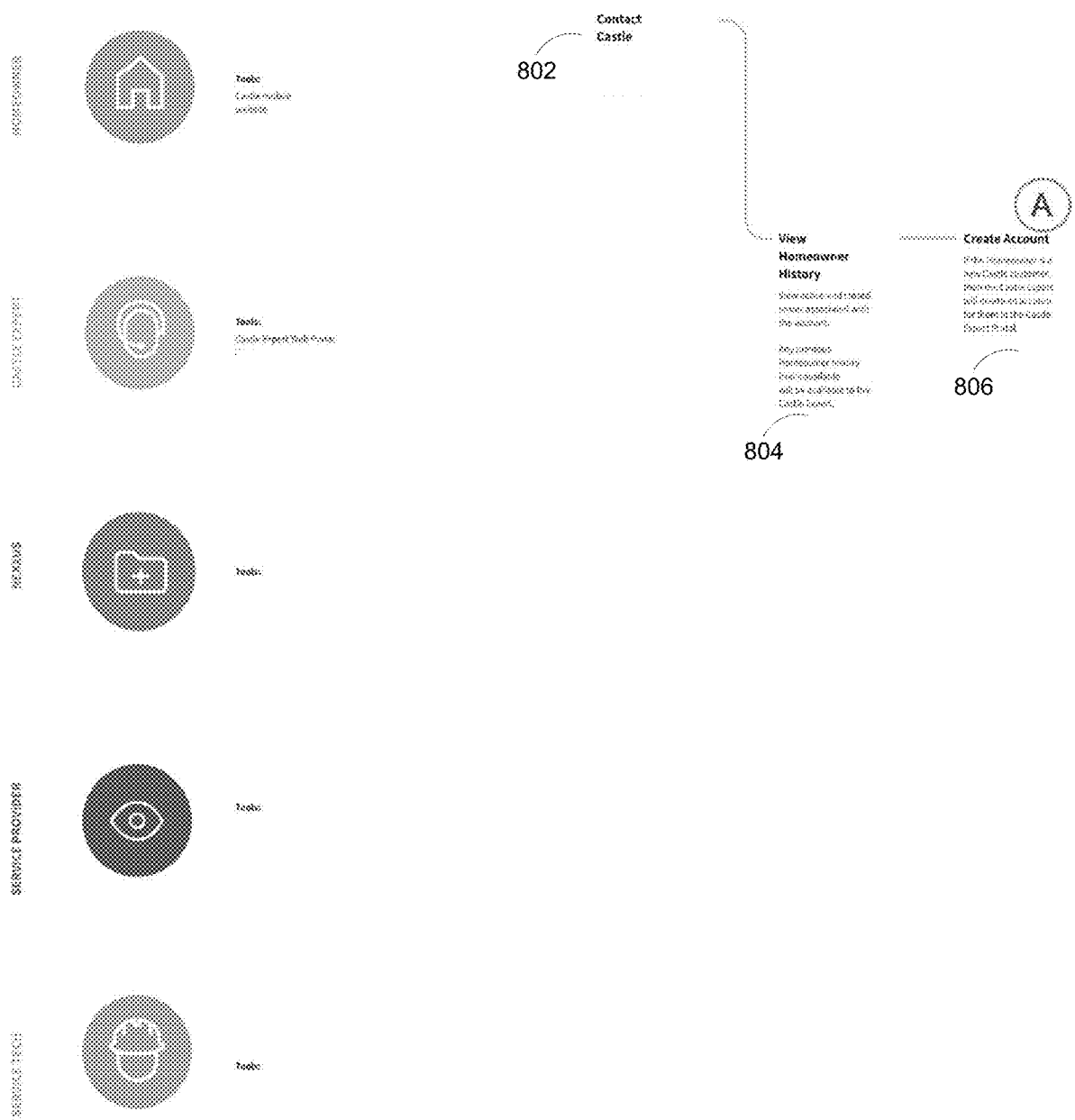
FIGS. 8-16 are alternate process flows of an exemplary turnkey home repair process executed on a resource management system.
Figure 9:
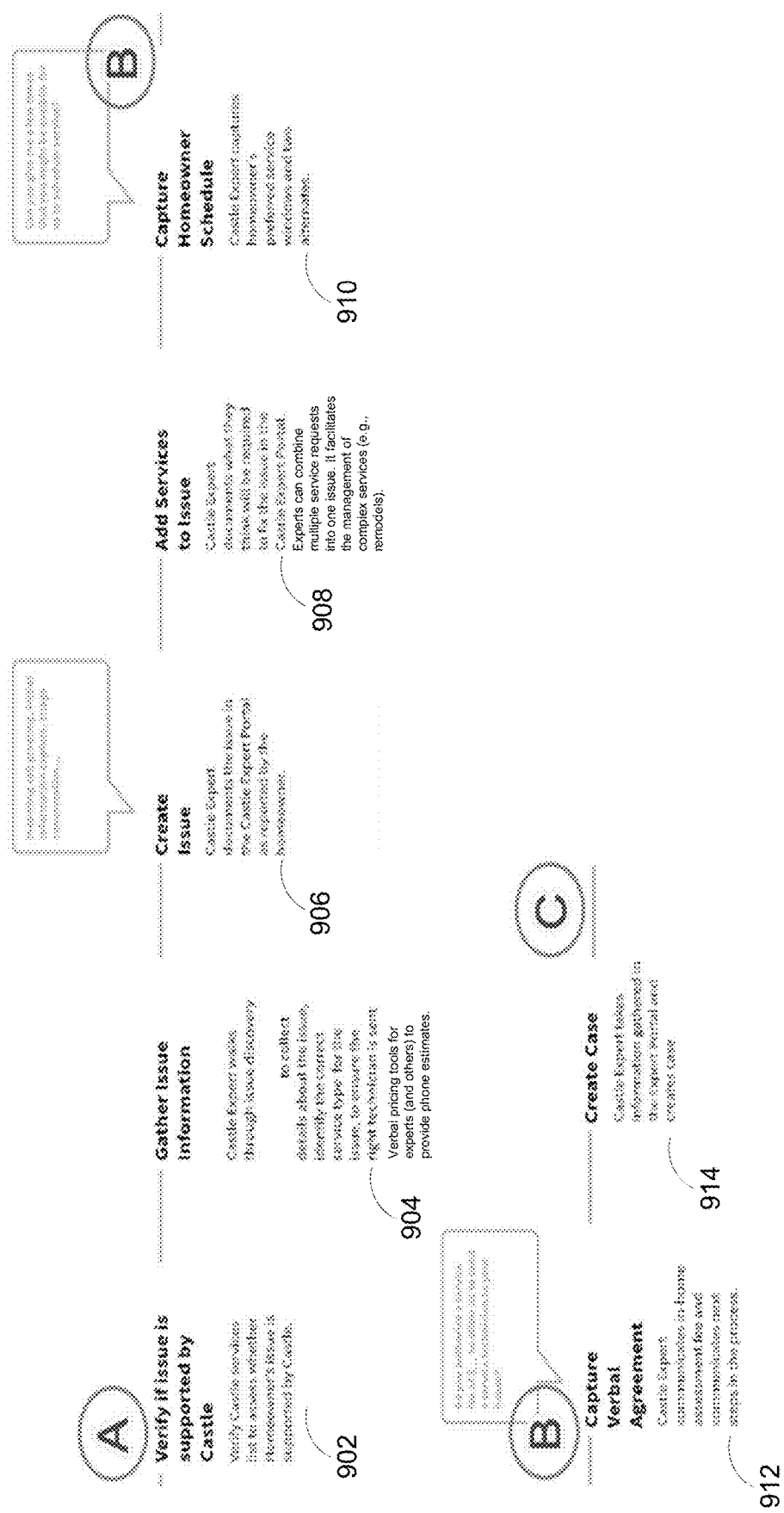

With the work completed by the SPT and approved by the homeowner, or when the offer is rejected by homeowner, the resource management system notifies the homeowner that the payment is due, which is then repeated until the invoice is paid at 626, 702 and 704, as shown in FIGS. 6 and 7. Payment triggers the resource management system to process the payment and notify the CE to close out the case at 708-714. Unlike known services, the system provides a concierge service. Instead of requiring users to spend time searching for qualified and responsible service repair technicians, the disclosed turnkey home repair process application leverages the in-depth knowledge of the CE (e.g., automated expert engine in some systems) that guides the homeowner in home repairs using a simple and easy to understand language. The home repair service app provides referrals to and commitments from screened and vetted professionals. The disclosed schema is unique and efficiently represents end-users, cases, SPs, and proven solutions to home maintenance issues. Some alternate turnkey systems are fully automated with the initial estimates, post-audit analysis, and all responses occurring entirely without human intervention (e.g., automatically) through chatbot engines, such as those disclosed in Chatbot Artificial Intelligence assigned U.S. Ser. No. 16/374,495, which is herein incorporated by reference in its entirety. Some fully automated turnkey systems process user-provided audio files, videos, and/or static images or photographs, which may also include logic that derives output from a knowledge base through artificial intelligence.

Some web home repair services apps are rendered through mobile devices, such as the exemplary home repair mobile app referred to as Castle, in the processes shown in FIGS. 8-16. The processes begin when the end-user (the homeowner) contacts Castle's backend through a wireless media, landlines, email, SMS, a chat window, etc. at 802. If the home repair mobile app system does not have a homeowner history, the system creates an account and harvests dwelling and homeowner information through the EP at 806. Otherwise, access to historical records is provided at 804. At 902, the system verifies that the issue needing repair is supported by the resource management system (Castle) in FIG. 9. The system captures the issue in the EP and captures the homeowners schedule and three preferred service windows at 904-910. At 904, price estimates and ranges are rendered locally or through cloud computing and/or speech recognition systems. Cloud computing is the on-demand availability of computer system resources used herein, especially data storage and computer processing, without a direct active management by a user. The term also describes data centers available over the Internet.

Unlike conventional pricing processes that are limited to rules, some price estimate systems and payment platforms process costs and pricing data to render pricing models that reflect volume, market rates, benchmarking analysis (that reflects historical costs), and stock availability. In some systems, the payment platforms automatically track the prices/stock availability of expected services and transmit user's notifications when there is a change. In some systems, price estimates or quotes are based on prescriptive analytics that gathers data from a variety of descriptive and predictive sources to dynamically generate the pricing models and render price estimates and ranges. The prescriptive selling analyzes data of the home's conditions including audio files, video files and/or static images of the home, item, or items, (e.g., an individual article or group of articles) that are in need of or subject to repair and process data relating to the rendering of each service or repair. The payment platforms provides pricing and related information to a user (e.g., end-users, customers, and/or other users) through an aural quote, an SMS quote, an email quote, a web dashboard quote, and/or other API delivered quotes. In some systems, the price estimates reflect a ballpark estimate or ballpark range subject to an on-site adjustment or a flat/preset fee for a repair. In some systems, the payment platforms are local or remote from the declarative client(s) 102.

At 908, some systems automatically bundle requested services through the CE EP portal. Bundling simplifies repair requests, increases efficiencies, reduces distribution costs, and improves the completion times of multiple repairs. It allows the user to rely on a single source to complete multiple repairs as a package bundle without opening up the transaction to a line-by-line negotiation or a price breakdown. At 914, the system also gathers information and generates a case in a project control center of the RSM database 120 following the capture of the user's consent (e.g., verbal consent) at 912. The project control center is where the resource management systems manages projects.

Figure 10:
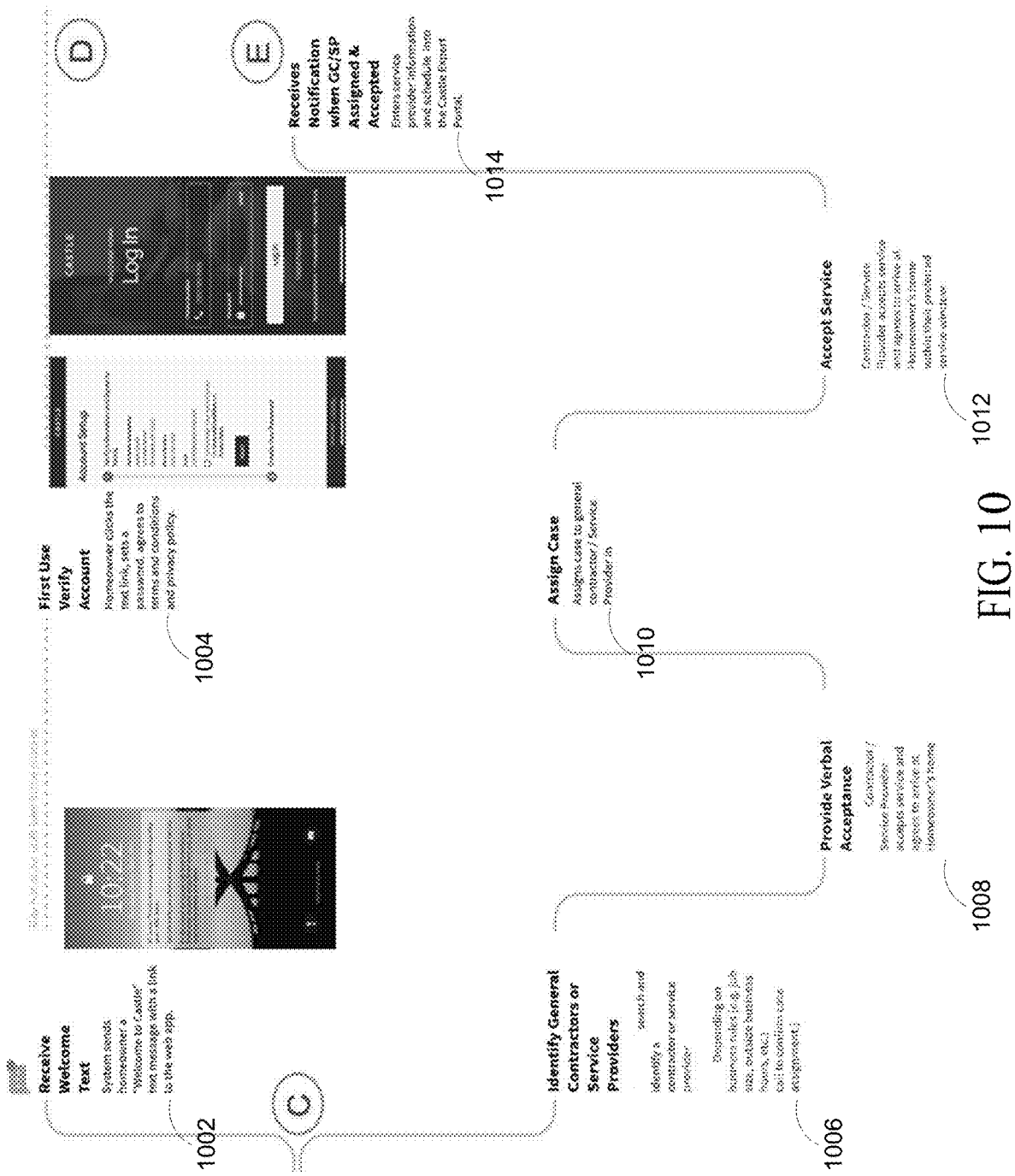
Figure 11:
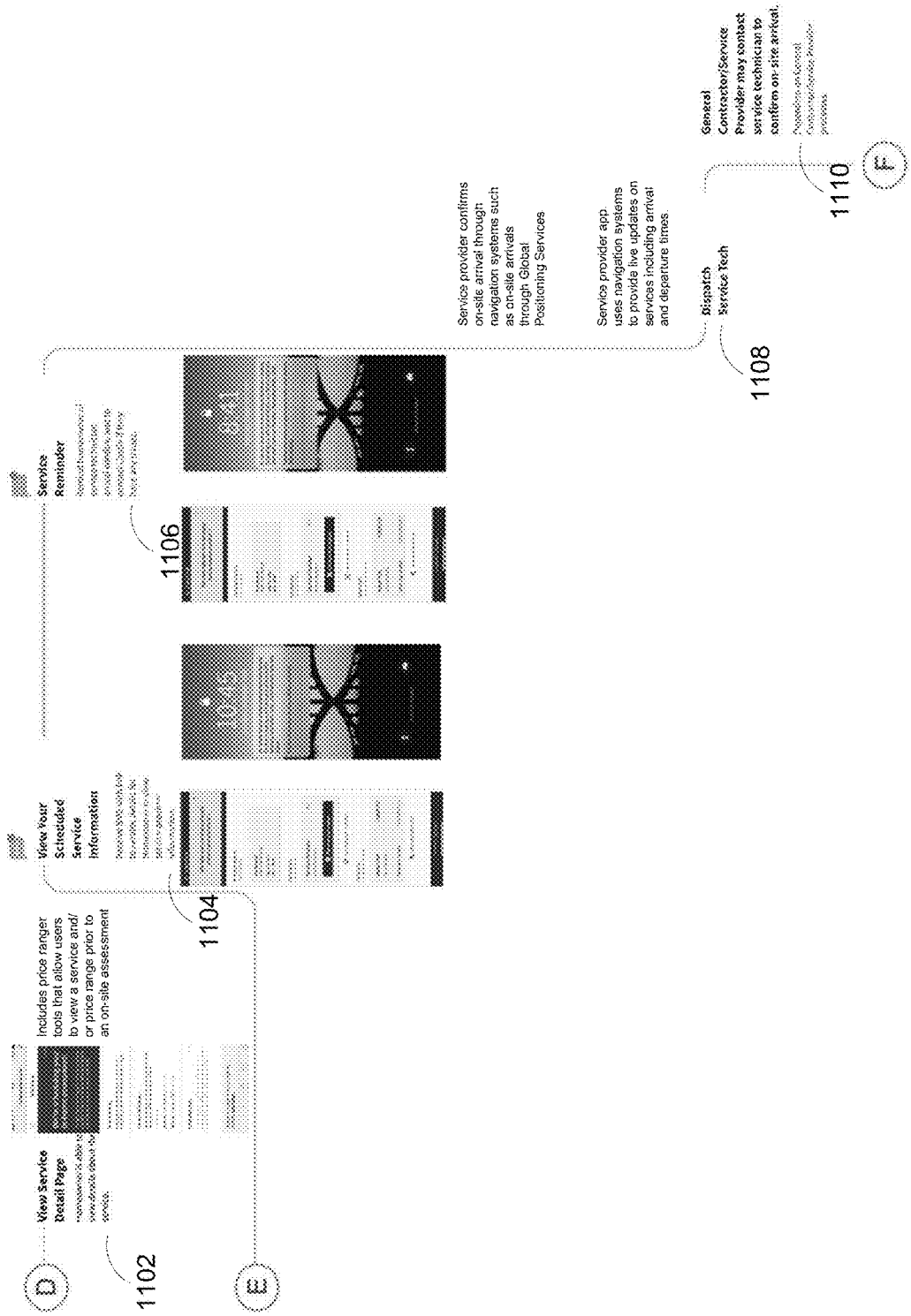

Homeowner registration triggers a welcome text and a user actuated link that includes an address and specifies a communication protocol that is used to access the system at 1002 in FIG. 10. Once connected, the end-user (the homeowner) completes the account set up at 1004 and 1102. When viewing the service details, users can also view estimate (a.k.a. quote) ranges and pricing details with minimal effort at 1102. In some systems, one or more price ranges and details are dynamically updated and processed at the same rate as the updates occur to identify and alert users to price savings, such as when the cost of materials decreases, when a predetermined price is reached, or when prices are reduced.

If the end-user is not a first-time user and recognized by the system, the system will execute an automated search and identify a screened and vetted service professional. Some identifications are based on capabilities, location, service type, and ability to meet the homeowner's schedule. Once assigned at 1010, acceptance is made verbally and recorded at 1012, and in some alternate systems is confirmed by an SMS or email message to the contractor and the SP in response to a speech-to-text engine's conversion of the verbal acceptance. At 1010 the system assigns the case to the service professional. Some assignments are made based on a statistical weighting of geographic location, service types, availability to meet the homeowner's schedule, and customer ratings based on an averaged rating factor. Once accepted, acceptance is written to the Castle EP at 1014 and an SMS message is transmitted to the homeowner's device containing the details of the agreement at 1104 in FIG. 11. If service is scheduled a predetermined amount of time in advance, a reminder is automatically sent to and/or automatically generated by the homeowner's device at predetermined intervals at 1106, the service technician is dispatched at 1108, and arrivals at the designated location are confirmed at 1110.

In some systems, a Global Positioning System (GPS) software app or platform in communication with the declarative client 102 tracks the dispatch and arrival times of service technicians to and from locations. The GPS enabled software app or platform reduces drive times for service technicians by mapping the most effective travel routes to destinations and establishes more accurate predictive windows (e.g., predictive arrival windows) for homeowners and users by joining or associating one or more tasks with one or more geographic locations. Some systems allow repair service geographic locations to be prioritized based on travel route efficiency and analysis of real-time and/or historical traffic conditions and other factors (e.g., the complexity of the repair, the locations of the needed materials, etc.). In some applications, the GPS software app. or platform allows the system to reduce trip charges when a scheduled service is in proximity to another allowing service providers to combine multiple single-trip service routes into a single route minimizing the miles technicians travel and the wear-and-tear put on vehicles that get them there. Besides reducing the system's carbon footprint, the GPS software app allows the system to assign travel costs more accurately, confirm service technician locations, eliminate manual confirmations of on-site arrivals and departures, and facilitates a map-based scheduling. The map-based scheduling allows other service technicians to deliver the next scheduled service to another client or allow a next appointment to be re-scheduled. This may occur when the GPS software or platform indicates a next scheduled predictive service window is likely to be missed based on the service technician's location and/or current/real-time traffic conditions automatically and/or in response to a query. Besides increasing customer satisfaction by minimizing long predictive appointment windows, missed appointments, and eliminating long wait times, some GPS apps provide users with real-time service provider tracking by generating map-views of the service technician's location through the system or a service provider app in communication through the CE EP portal. The map-views increase the visibility of the service technician and may track how vehicles are driven (e.g., how fuel is conserved) by reporting geolocations through the system's map API. Besides showing routings and geographical locations, some systems provide indoor maps too that seamlessly transition between outdoor and indoor navigation. Indoor navigation may combine the mapping and navigation service used to drive to a location with an indoor positioning system. The indoor positioning system triangulates locations by processing signals transmitted from multiple low energy beacons (e.g., between 0.01-0.10 W depending on signal propagation conditions), WiFi-positioning that processes hotspots (e.g., physical locations that provide Internet access) and/or wireless access points, and/or magnetic fields to determine where a device is located. The location identifications may be as precise as within one to ten meters, for example.

Figure 12:
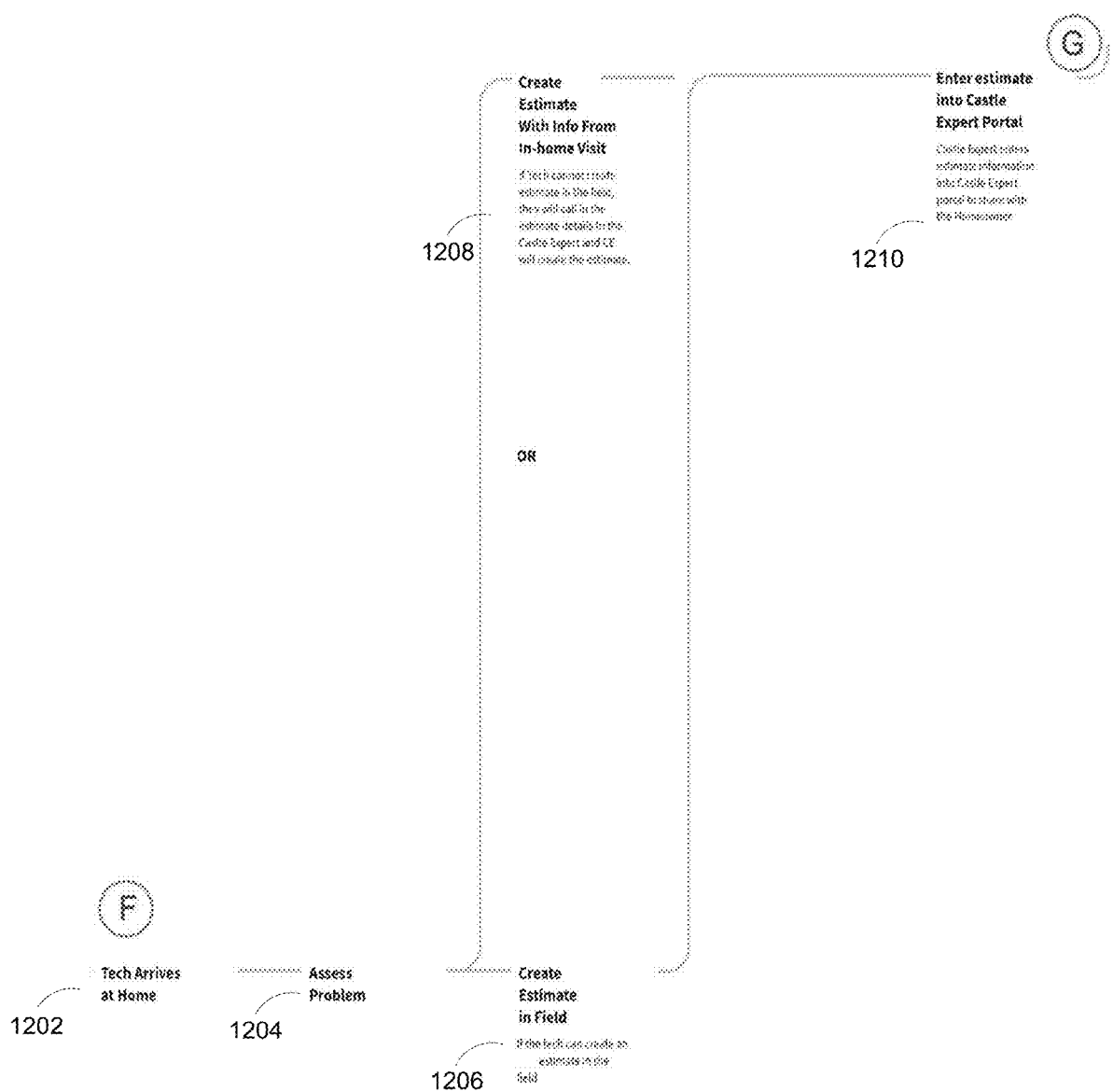

The SP technician arrives at the location and assesses the issue and generates an estimate in the field or transmits the details to the CE that automatically generates the estimate that is entered in the CE portal at 1202-1210 in FIG. 12. In some systems, augmented reality enhance, identify, or measure attributes of objects and articles that are in need of repair through the integration of computer-generated perceptual information across one or more sensory modalities rendered by a mobile device, which may include visual, auditory, haptic, somatosensory functions, for example. In some systems, a mobile device track and access one or more physical object and/or space dimensions stored in memory to identify accurately measure the physical items or space captured in the mobile device's camera's feed, and in some applications, activates the mobile device's a depth sensor and second camera for motion tracking. Through comparisons of selected characteristics, the mobile devices identify real-life objects or space, that in-turn provide access to previously stored measurements to render object or space measurements. With items or areas are in need of repair identified, a user can take a picture of the items or spaces with a virtual measuring line or lines superimposed on the image that can be stored in memory and uploaded to the CE portal at 1208-1210. In other applications, the mobile device accurately places virtual items in a mobile device's camera feed to provide an estimate of how the items would look amongst existing items. Some systems track the mobile device's position via GPS, distance to a surface via Light Detection and Ranging (LiDAR) scanners, and mobile device's orientation in real-time to identify and measure three dimensional attributes of objects and/or the space around near or around an item to identify the item and/or space and to record its location. In some instances, locations are used to verify the property/space serviced to fulfill warranty guarantees if further repairs are required.

In other systems, users may identify and/or measure linear distances of objects by pressing a virtual button on their mobile devices with the camera focused at one end of an object (e.g., a camera is enabled) and moving the camera's focus along the item to another end of the item and pressing the button again. Using augmented reality, a virtual line is drawn between these points that stays visible as the user moves the camera from one end to another end. The virtual line stays anchored where it is placed and remains visible when the camera captures portions of the item on or near the line. When the second button is pressed, the line is locked-in, a measurement is rendered and associated with the image allowing the mobile device to lock-in to other points on the object. In some systems, when the start or endpoint is not correctly placed on the item, the user can drag the highlighted endpoint on the image through a finger movement across the image to place it in a correct position, which is then reprocessed to render a measurement. This alternative system, simulates a virtual tape measure that allows users to measure and store linear distances of an item or space by length, width, and/or depth and/or calculate volumes that are stored in the mobile device automatically. In some systems, the mobile device's virtual inclinometer measure the angle of inclination with a vertical surface. The line or lines superimposed on the image, the image, and/or inclination angle are uploaded to the CE portal at 1208-1210.

Figure 13:
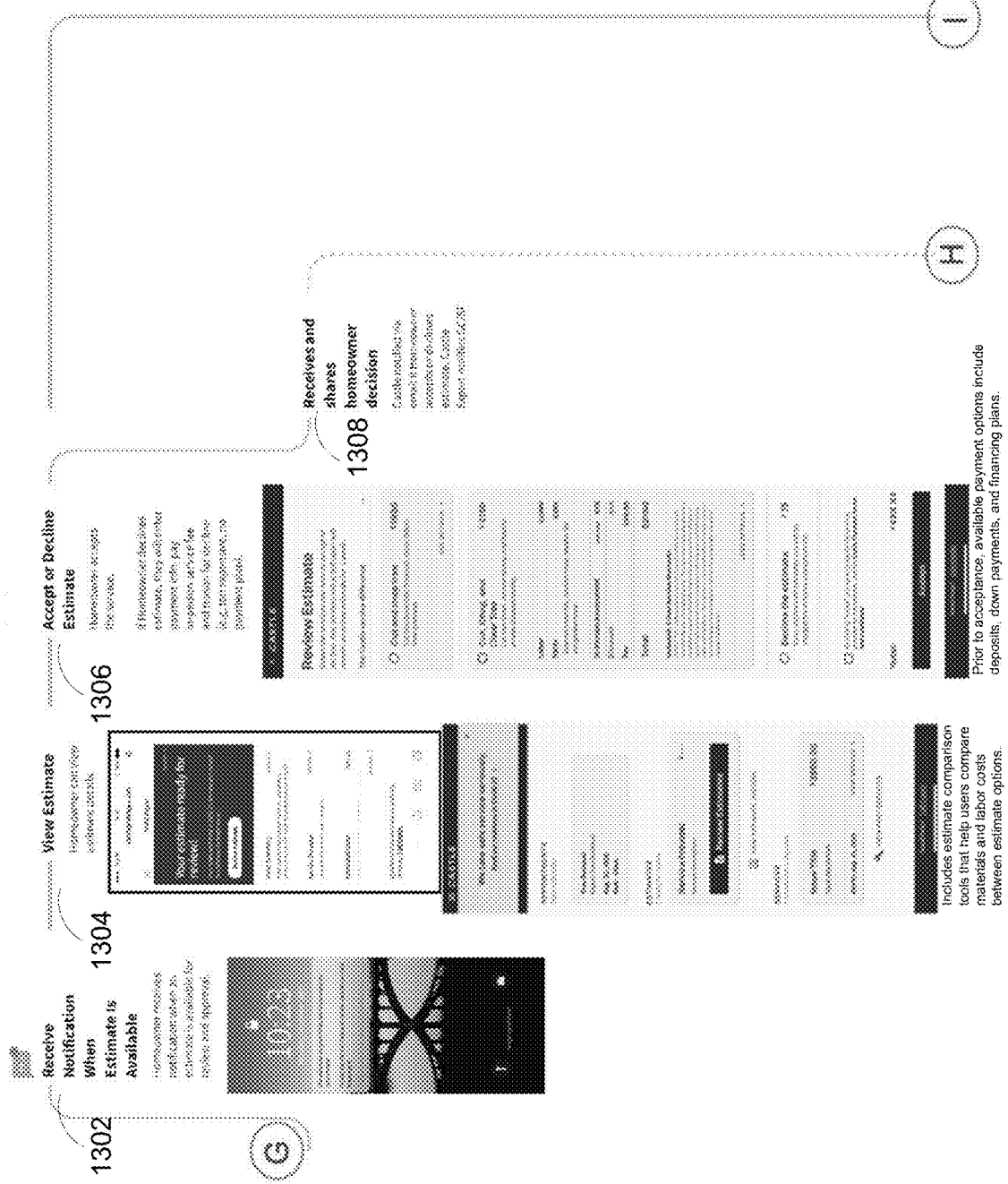

At 1302-1308 the homeowner's device receives and the homeowner reviews the estimate and either accepts or declines the estimate via their device (e.g., electronically), which is shared with the service provider in FIG. 13. Some systems include aggregators or aggregator platforms that aggregates information for users about materials, services, and prices and display the information through comparison tools or platforms, which allow users to select the estimates or quotes that best meets their objectives at 1304. The aggregator and comparison tools may provide service and material information (e.g., spec information) and information on promotional campaigns. In some systems, listing are displayed that identify the service provider's name and price estimates in a side-by-side and/or stacked display that compares the features that the user identified (e.g., materials, price, schedule and/or etc.). In some systems, user-selectable filters associated with features of a particular repair type are displayed. By making filter selections (e.g., by marking interactive boxes or enabling radio buttons in option selection areas), listings are displayed side-by-side or in a stacked view showing the service provider's name, prices and/or features that the user marked or enabled. Price history information may also be included. Some aggregator and comparison tools offer price alerts functions that alerts users or subscribers when a price drop occurs or when a user's entered or selected price is reached as the information is received (e.g., at the same rate as the price is updated).

When a user accepts or declines one or more estimates at 1306, the user is offered payment options. The options may include making payments from their mobile devices, credit cards, debit cards, digital wallets, digital currency and/or other services that are serviced or provided by a bank or a financial institution. In some applications, the payments are approved through passcodes, touch identifications, face identifications, and/or other means on the user's remote device. For users that manage money through digital applications, payments may be made through Apple Pay, PayPal, Venmo, and/or other means for example. Some systems allow payments to be split or distributed across digital applications through many apps and/or websites and in some systems, receive and process deposits and/or down payments for services in traditional and/or cryptocurrency.

Figure 14:
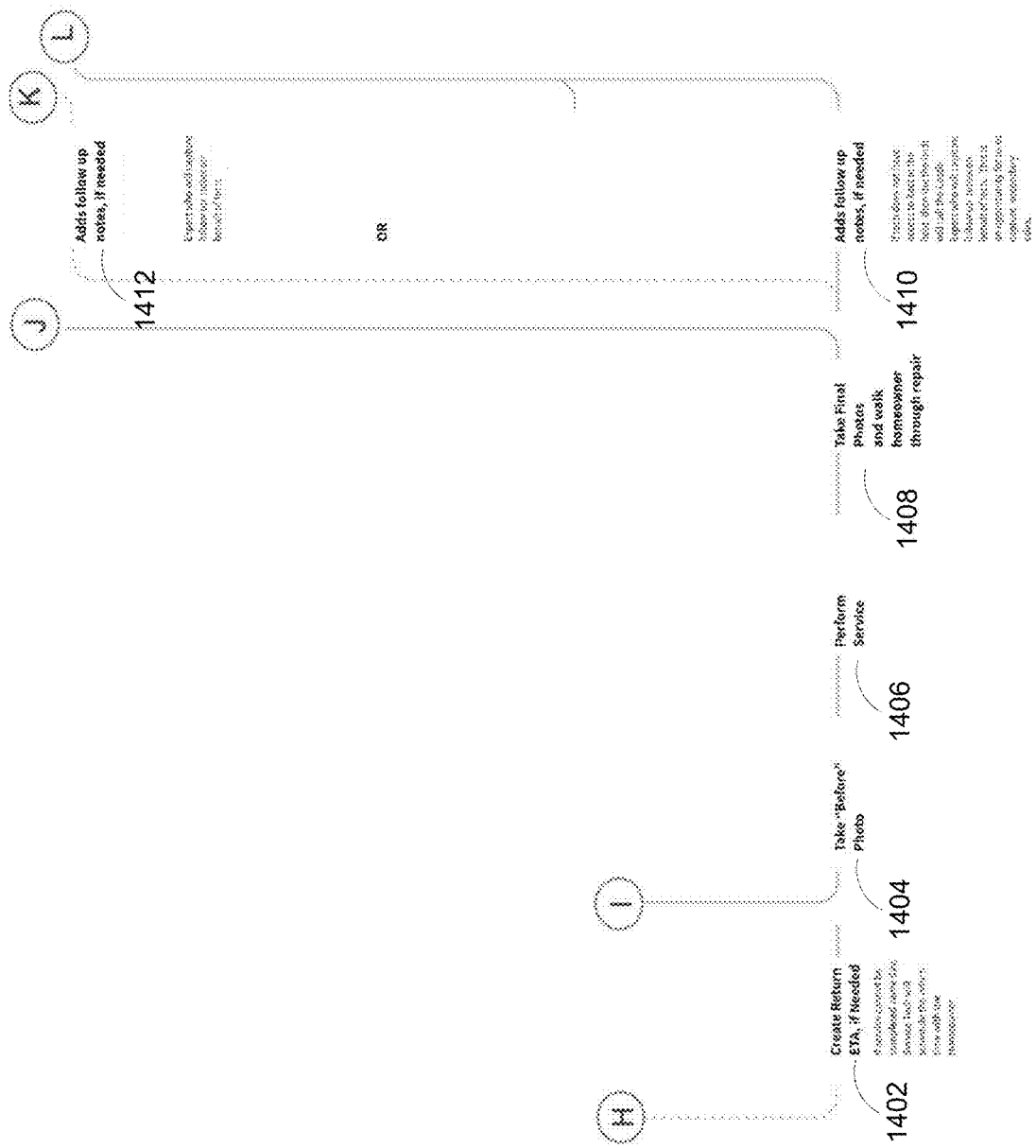
Figure 15:
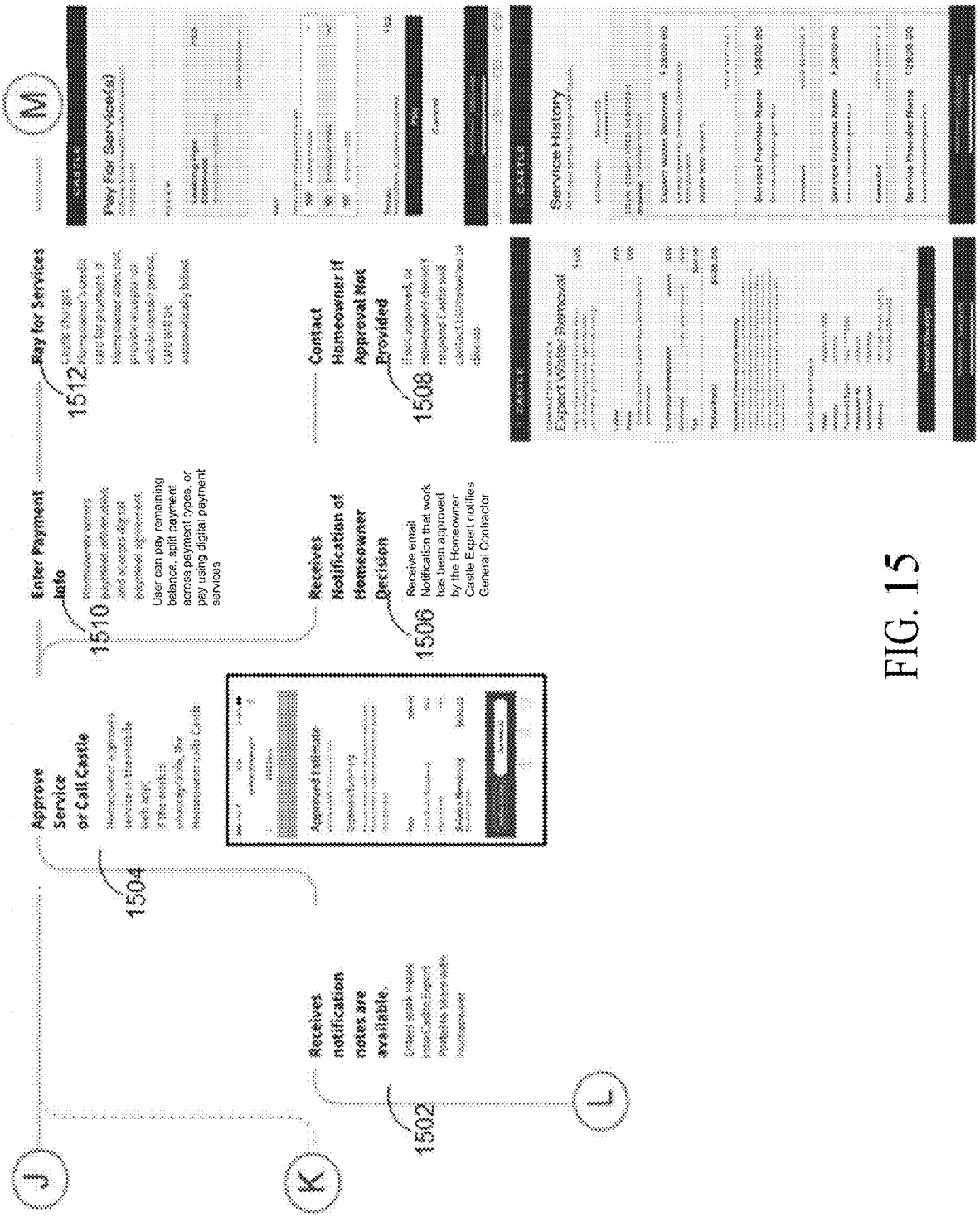
Figure 16:
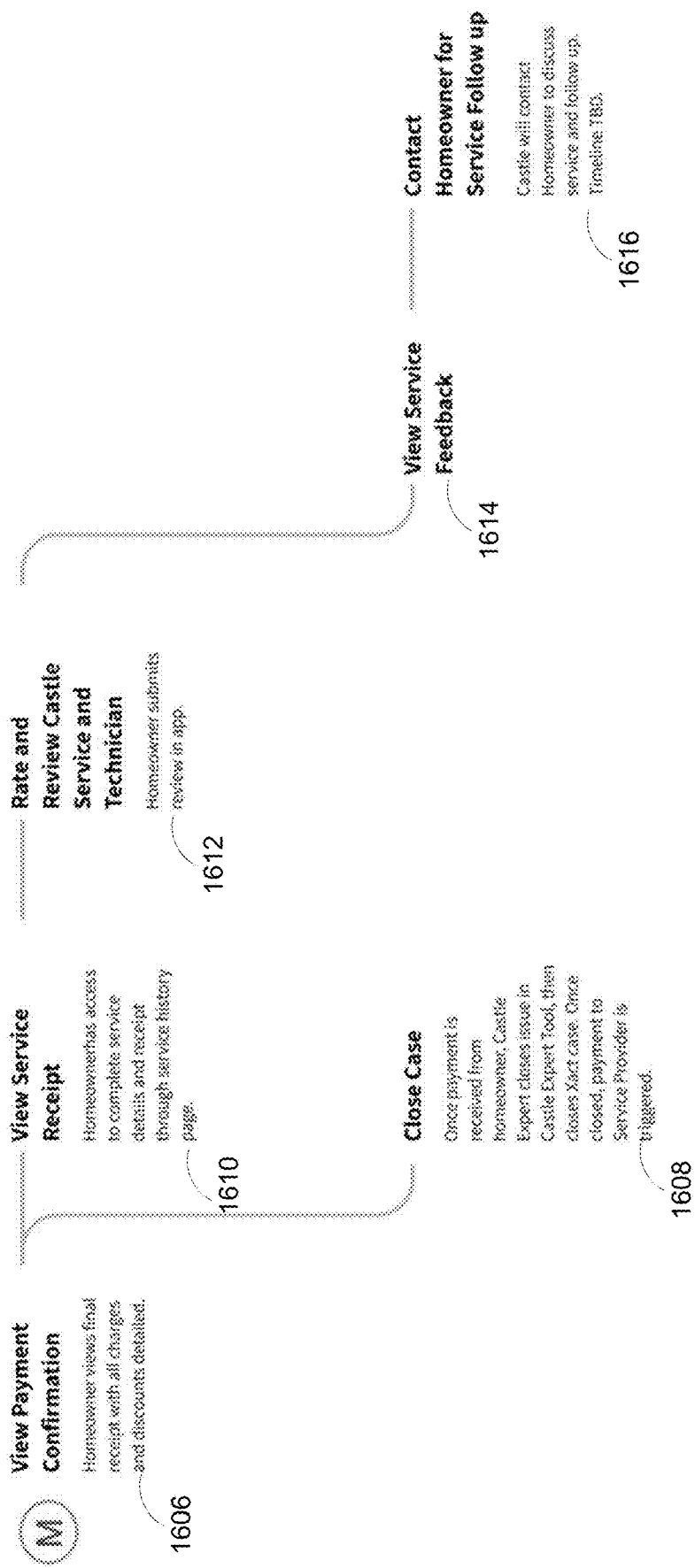

At 1402, notification notes are shared with the homeowner in FIG. 14. If the estimate is accepted, approval is made through the mobile app. Before the work is commenced, pictures are taken and uploaded to the system. Once work begins, it continues until the project is completed, and if further work is need, additional time is further scheduled until the project is completed at 1402-1406. Once the project is completed, the completed repairs are explained to the homeowner, final pictures or video of the completed project are taken, and notes are added that are uploaded to the resource management system that can be shared with the homeowner via their device at 1408-1412 and 1502 as shown in FIGS. 14 and 15. In some systems, project completion triggers a status notification to the homeowner that the contracted service(s) are completed. The completion time is transmitted to the CE through the CMT. If work is approved by the homeowner via their device, the homeowner enters the payment information and the service is charged and confirmed at 1506, 1510-1514. If not approved, the issue is mediated at 1508. The homeowner can view a final receipt at 1606 and once payment is receipt, the case closes at 1608 of FIG. 16. Homeowners have access to the complete service details at 1610 and can submit a review at 1612. Feedback can be viewed at 1614 and follow-up service can be scheduled at 1616. If at any point a homeowner needs to contact a service provide, a one-click contacting feature allows the homeowner to reach the service provider with a single click on the mobile app at any time.

To access sites that render recommendations in the systems described above, connections are made that normally require connections to be formed between remote external resources and local interfaces. For each data object requested, interfaces send requests and in return receive responses from remote external resources, especially when SP and SPT's are identified. When content includes video and/or pictures, in addition to downloading textual resources, known interfaces download many images—some of them large. Establishing network connections for each request/response can waste network bandwidth and cause delays, as many network packets must be exchanged even before a request is processed.

Rather than requiring the remote management system to access multiple remote external resources on demand when recommendations are needed, some alternate remote management systems render and provide service professional and/or resource referrals from multiple remote resources through an alternate component layer 138 in real-time, near real-time, or after a delay. The term real-time refers to computer systems that update and process information at the same rate as they receive data, enabling them to direct or control a process, much like an automatic pilot. The alternate component layer 138 downloads data and content and intercepts links to and between the remote data elements, such as words, symbols, and images and other documents, and transparently maps those links to redirected links associated with nearly identical data in the centralized RSM database 120. The redirected links are generated by the component layer 104. The redirected links provide new addresses to the element originally linked to remote objects and the protocol that may be used to access them centrally in the RSM database 120. The new addresses for the resources specify the new source and/or destination that reside locally in a backend cache and/or backend proxy, which may be backed up and/or stored and served by the local RSM database 120 that resides in a cloud storage 140; or in alternate systems, stored in a local document management platform. By redirecting the link and/or generating new links, the resource management system can provide recommendations, relay SPT assignments, and deliver harvested content from its own local cache, local server proxy, and/or turnkey software applications. The systems are not subject to the delays and latencies that come with requests to remote sources served by outside networks. These processes, in turn, reduce the load on the external remote resources and network bandwidth consumption. By serving content locally and centrally, content rendering speeds up dramatically.

Figure 17:
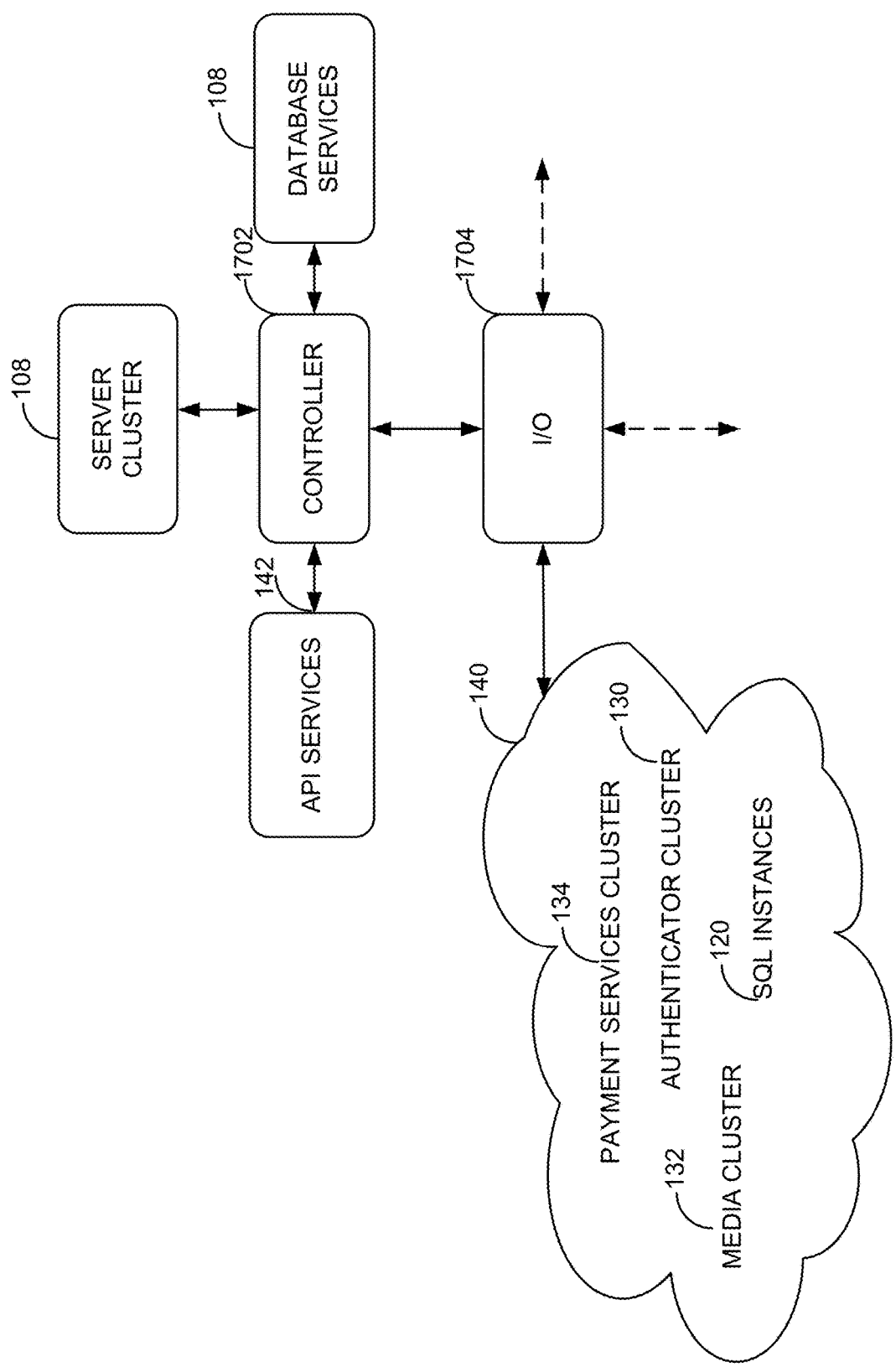
FIG. 17 is an alternate system diagram of a resource management system.
Figure 18:
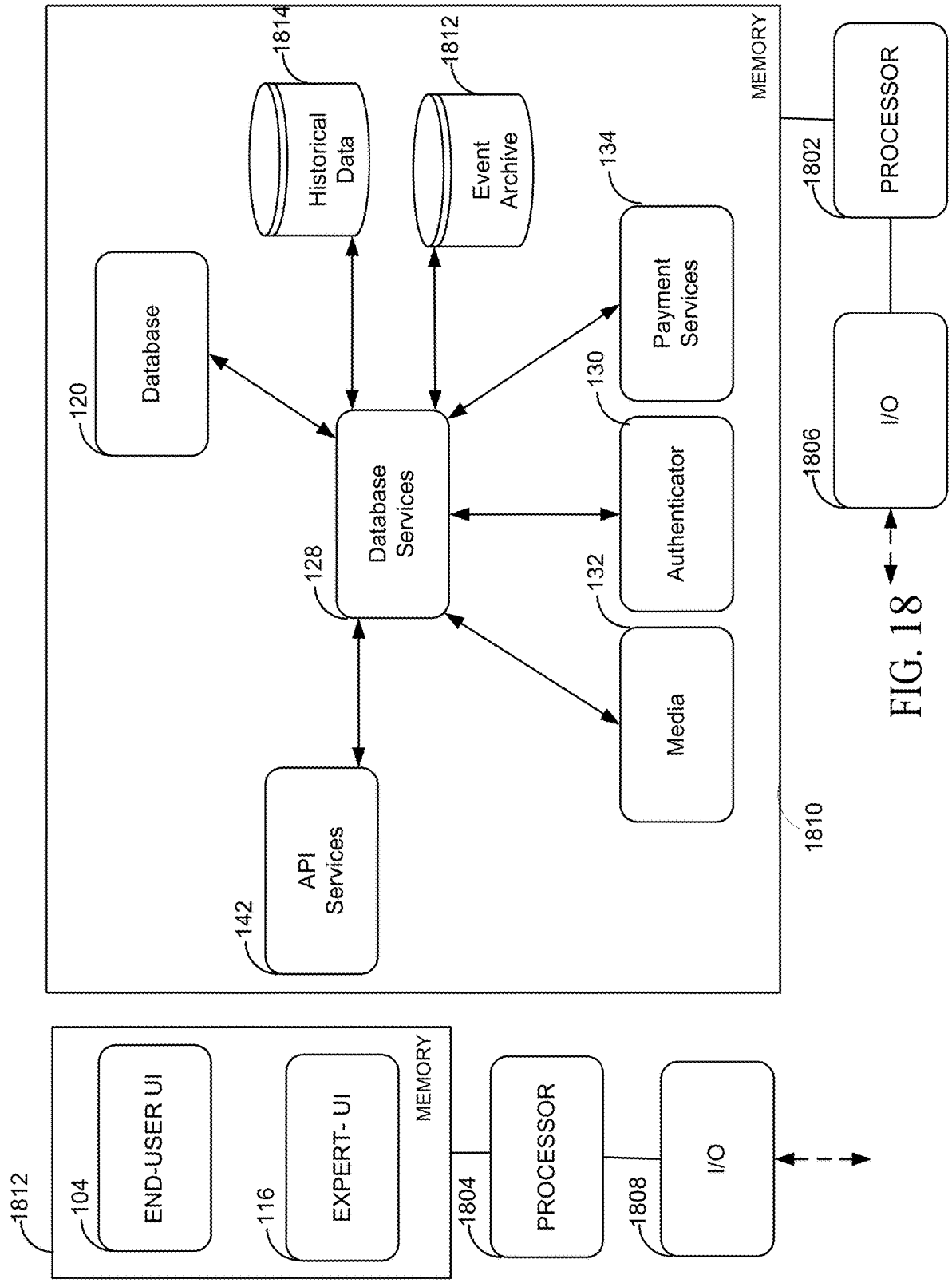
FIG. 18 is a second alternate system diagram of a resource management system.

FIG. 17 is a block diagram of the automated resource management system that may comprise the systems shown in FIGS. 1, 2, and 18 and executes the process flows described above and those shown in FIGS. 3-16 and 19-23. In FIG. 17, the controller 1702 interfaces the server cluster 108, API services 142, and database services 120, through an input/output device 1704. The SQL database 120 may be distributed over several computers or maybe a unitary depository residing in cloud storage 140 as shown. The database 120 may include several databases or database instances, and information from multiple sources types; and stores the data in a variety of different formats. The controller 1702 interfaces the payment services cluster 134, authenticator cluster 130, media cluster 132 and SQL instances 120. Some SQL instances 120 apply transformation functions (e.g., correlations functions, linear classification functions that normalize by feature, etc.) to generate surrogates for missing values and outliers, and perform data validations (e.g., via comparisons to acceptable data ranges) to reduce distortions in the stored data.

FIG. 18 is a block diagram of an alternate automated predictive system that may represent the systems shown in FIGS. 1, 2 and 18, and executes the process flows and characteristics described above and those shown in FIGS. 3-17, and 19-23. The system comprises processors 1802 and 1804 and a non-transitory media, such as a non-volatile memory (the contents of which are accessible by either of the processors). The I/O interface 1806 and 1808 connects devices and local and/or remote applications, such as, for example, additional local and/or remote monitored devices. The memory 1810 and 1812 stores instructions, which, when executed by either of the processors 1802 and 1804, causes the resource management system to render some or all of the functionality associated with managing resources as described herein, such as a device the provides home repair services, for example. The memory 1810 stores instructions, which, when executed by the processor 1802, causes the automated resource management system to render functionality associated with the server cluster 108, API server/cluster 142, media server/cluster 132, authenticator server/cluster 130, the payment services server/cluster 134, an event archive 1812, a historical database 1814, and the SQL/RSM database 120. The databases 120, 1812, and 1814 may be distributed over several computers, or may be a unitary depository or a cloud storage 140. The database 120 may include several databases and information from multiple sources types, and stores the data in a variety of different formats. The memory 1812 stores instructions, which, when executed by the processor 1804, causes the automated resource management system to render functionality associated with the end-user-UI 104 and the expert-UI 116.

In yet another alternate automated resource management system, the non-transitory media provided functionality is provided entirely through cloud storage and services 140. In this automated predictive system, cloud storage and services 140 provides ubiquitous access to the automated resource management system's resources and higher-level services that can be rapidly provisioned over one or more networks. Cloud storage allows for the sharing of resources to achieve coherence services across many devices at many locations, and provides economies of scale.

The memory and/or storage disclosed 1810 and 1812 may retain an ordered listing of executable instructions for implementing the functions described above in a non-transitory computer code. The machine-readable medium may selectively be, but not limited to, an electronic, magnetic, optical, electromagnetic, infrared, or semiconductor medium. A non-exhaustive list of examples of a machine-readable medium includes: a portable magnetic or optical disk; a volatile memory, such as a Random Access Memory (RAM); a Read-Only Memory (ROM); an Erasable Programmable Read-Only Memory (EPROM or Flash memory); or a database management system. The memory 1810 and 1812 may comprise a single device or multiple devices that may be disposed on one or more dedicated memory devices, or disposed on a processor or other similar device.

Figure 21:
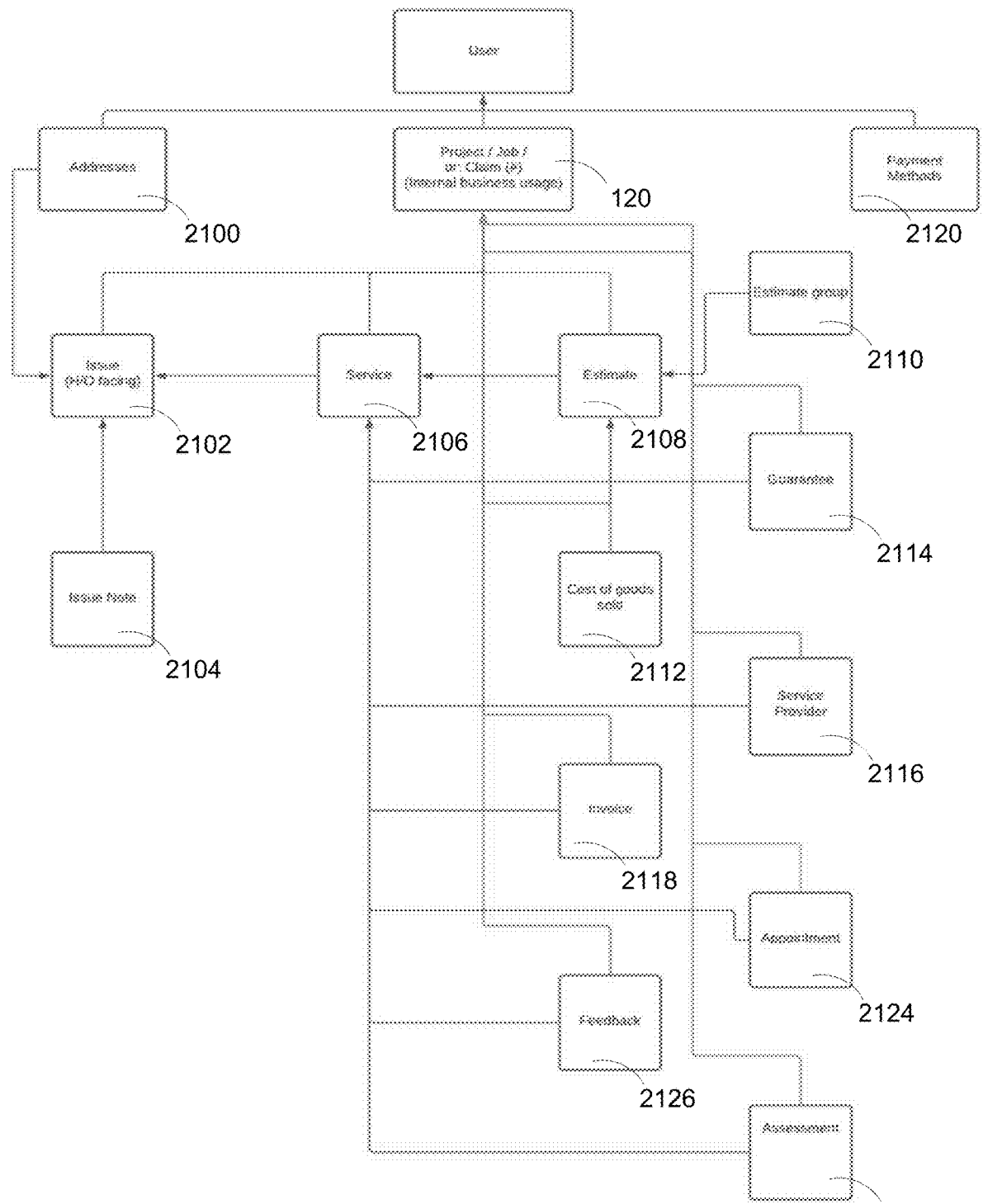
FIG. 21 is a third alternate system diagram of a resource management system.

FIG. 21 is a third alternate system diagram of a resource management system in which linked data structures are processed. The data structures are records linked together through links and/or pointers through dynamic allocations that reside in a persistent SQL/RSM database 120 and/or an in-memory database. An in-memory database resides completely in a main memory, such as a volatile memory, not in a file system. It provides faster processing (no disk I/O) than conventional databases and is persisted for re-use by a backup system and/or the SQL/RSM database 120 when processing connections are closed and the in-memory database is deleted.

Access to the alternate resource management system occurs when the user is authenticated. The systems allow end-users to access and authorized members associated with the end-users access and privileges within the resource management system at the security level at which they are assigned. With authentication executed, the end-user or authorized member may enter a project or job request through an end-user UI 1004 at 2102 that accesses addresses 2100. The project or job may include issue notes 2104, which comprises a brief record written to the in-memory database or the SQL/RSM database 120. With the details of the issue logged into a service record via a CMT, the CE adds a CMT case identifier to the expert portal and transmits an alert to a trade partner association engine that assigns it to one or more SPs that provide a one or more discrete or bundled quotes that reflect materials, services, and/or available/qualified service providers at 2108 and 2110. The discrete or bundled quotes are provided by one or more SP or SPTs, and in some systems, may be customized by an end-user's menu selections.

In response to the creation of the estimate or quote record, the resource management system of FIG. 21 tracks an estimated cost of goods sold and workmanship and material guarantees that flow with the repairs that are selected by the end-user and retained in the database at 2112 and 2114. When a repair election occurs an assignment event follows via the CE EP portal. The system stores the assignment with time/date stamps, which thereafter attaches a time/date stamp automatically at each milestone event. The assignment event is routed to an SP and thereafter an SPT. Some portals designate SP and SPT availability through qualifications and unique geographic identifiers. The system is capable of tracing SP and SPT training, experience, and availability. When the SP accepts an assignment, the system serializes and stores the records with a second time/date stamp and a number to record and uniquely identify the event at 2116.

A payment platform 2118-2122 serves and processes assessments, invoices, and payment services to the resource management system of FIG. 21. The payment platform 2118-2122 comprises a turnkey payment platform that also interfaces different gateways and merchant accounts, from a single-touch payment action via an app and/or browser to mobile SDKs including PayPal, Venmo, and Apple pay, for example. In operation, an end-user interacts and authenticates with the resource management system while directly interacting with the payment platform 2118-2122. In use, the payment platform directs the end-user's application and/or requests, such as browser request, for example, to the required authorized external service. In some applications, account balances and assessments may be split across financial vendors and may include digital currency, including crypto-currency, for example. Thereafter, the required authorization is pushed to the payment platform 2118-2122 that process the payments and creates and pushes a payment tokens to the end-user UI 2102, which payment is drawn against. As described above, payments may be made in exchange for services and materials used to provide a quote (e.g., assessment) and/or in consideration of a repair.

Figure 22:
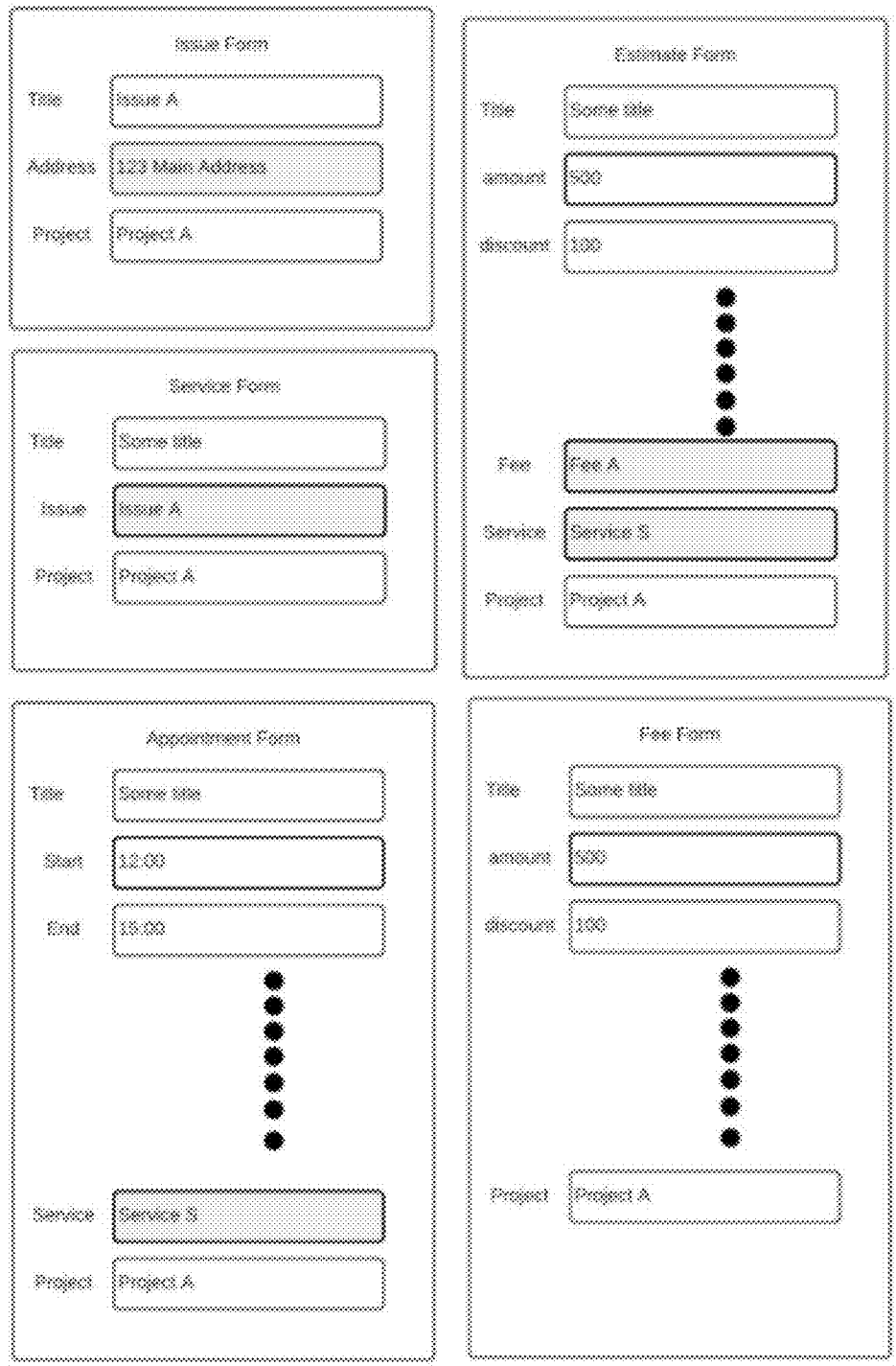
FIG. 22 shows exemplary mobile device screens.

The resource management system of FIG. 21 also allows end-users to make appointments 2124 and collect in-app feedback instantly 2126 across one/some/each of the end-user facing UIs instances. Using a customized feedback portals and an in-app feedback widget, the system collects feedback including ideas, repair feature requests, and suggestions from end-users at a central hub such as the SQL/RSM database 120 and/or in-memory database. The system keeps track of where the feedback is coming from including the EP, SP, and/or SPT allowing the resource management system to determine where the feedback is coming from and pinpointing the areas that the end-users express the most interest. In some systems, the feedback portals and/or in-app feedback widgets survey users on new product and service ideas to measure end-user opinions. Exemplary user interface screens that identify issues, receive and confirm appointments, and report on estimates and fees are shown in FIG. 22.

Figure 23:
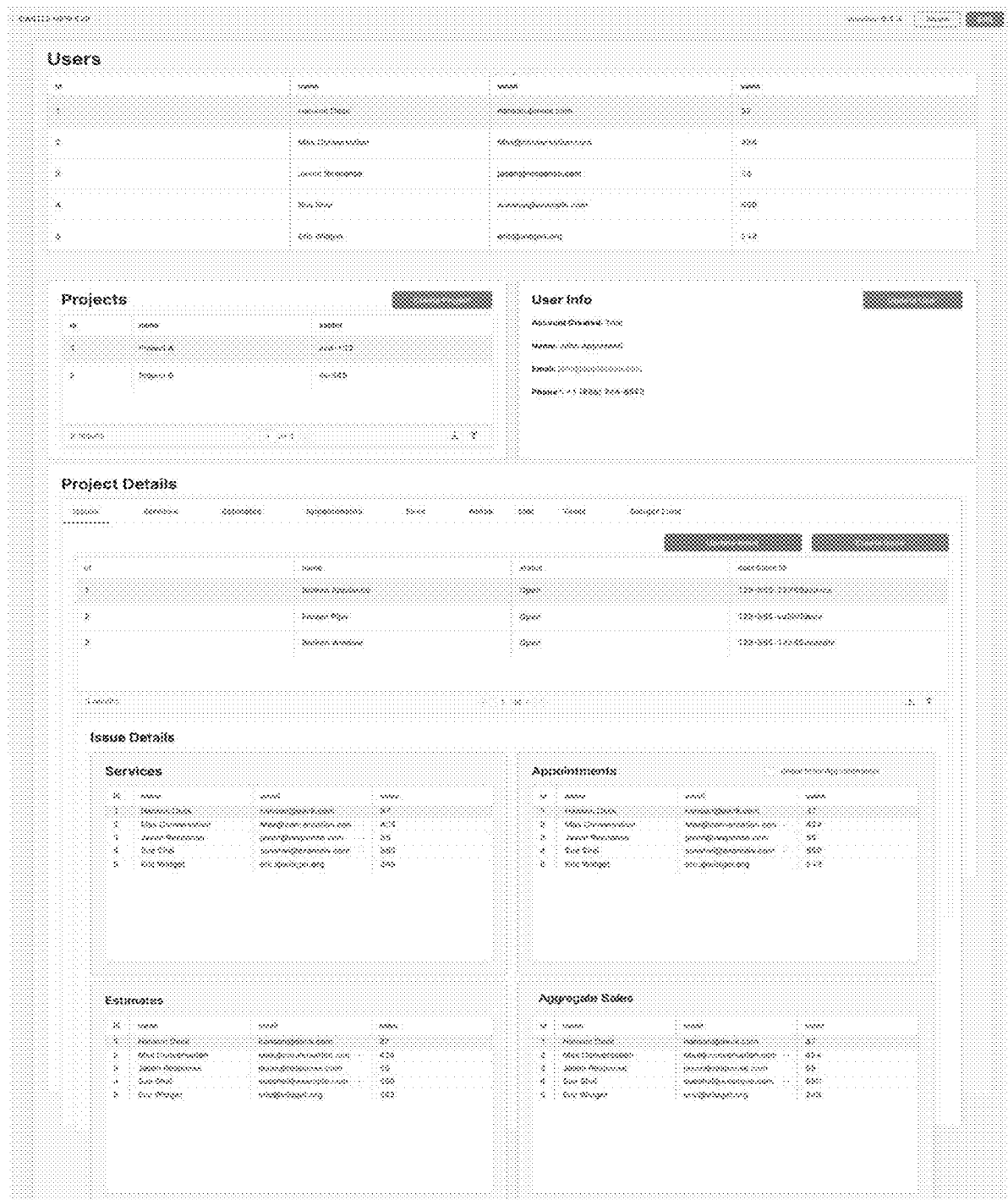
FIG. 23 shows an exemplary administrative screen.

FIG. 23 shown exemplary admin screens rendered by the resource management system of FIGS. 1, 2, 17, and/or 18. Service and user details are accessible through the admin portal or API 2124 including the name of the users, their addresses, and sales. Selecting or deselecting an item activates a program or feature. For example, when a user is selected, the program renders a service page with all of the details of the quoted services. Because the resource management system offers end-user's many options, multiple services are offered with the opportunity to make and/or update an appointment when one is selected. Other selectable tabs includes an issues tab for capturing issues associated with a repair, a services tab that captures descriptions of the quoted service, an estimates tab that includes all system initiated quotes, a fees tab that displays the fees associated with a service, a notes tab that captures residual information, a CRM tab for routing calls to a call center or a person support center, a task tab that enables task routing functions, and a danger zone tab that tracks end-user reimbursements.

The task router function allows a user to route information through different media or multiple forms of communication media whether it's through voice calls, SMS messages, electronic messages, and/or video calls to other destinations and/or SP, SPT, and/or agents concurrently that best match the required skill set to address and/or resolve the service request or issue. Some task routers allow multi-task/repair routing that specifies one, two or more destinations and/or SP, SPT, and/or agents. Some multi-task/repair routing include a CE enabled configurable priority that enables the CE to determines a task/repair queue level settings that determine the order in which tasks and/or repairs are made. In use, the task router doesn't just route tasks/repairs to one, two or more destinations and/or SP, SPT, and/or agents and forgets. In some systems, the task/repair routing includes incremental escalation logic in which the system automatically expands the destinations and/or other matched SP, SPT, and/or agents that can handle or resolve task/repairs and automatically assigns them when the task/repair is not resolved or addressed in a predetermined configurable time period rendering an automated failover. When a failover occurs, the task router rescinds the one or more earlier assignments through electronic messaging to minimize duplicate assignments. Real-time performance statistics are generated by the task routers through real-time monitoring rendered through dashboards and retained in the SQL/RSM database 120 and/or the in-memory database. The SQL/RSM database 120 and/or in-memory database store repair-event audit streams that dynamically build historical reports showing system performance In some systems, as repairs or services are completed and/or issues resolved, information or data on the completed repair/service/issue is captured and routed to an insurance company or an insurance company's proxy workflow or server that further processes the event. In some applications, insurance servers, their proxies, or workflows automatically evaluate the completed event associated with an insured object against an original insured object and automatically updates the insured property's features or characteristics. The updated may result in a lower premium, create an insurance opportunity, and/or maintain insurance eligibility without the user contacting the insurance company.

In FIG. 23, projects are further shown through issue details. Exemplary issue details include dashboards displaying the services quoted, the estimates accepted, upcoming appointments, and aggregate sales.

An "engine" comprises a processor or a portion of a program executed by the processor that automatically executes or supports the procuring, furnishing, and delivering of resources through a self-service portal. It also describes a special-purpose program that use models and/or deep learning algorithms to query big data and deliver resources. Big data describes large volumes of data—both structured and unstructured—that inundates a conventional resource management systems on a day-to-day basis. When functions, steps, etc., are said to be "responsive to" or occur "in response to" another function or step, etc., the functions or steps necessarily occur as a result of another function or step, etc. It is not sufficient that a function or act merely follow or occur subsequent to another.

The systems illustratively disclosed herein suitably may be practiced in the absence of any element (including hardware and/or software), which is not specifically disclosed herein. They may operate in the absence of those elements. Further, the various elements described in each of the many systems described herein is regarded as divisible with regard to the individual elements described, rather than inseparable as a whole. In other words, alternate systems encompass any variation and combinations of elements described herein and may be made or used without the various elements described (e.g., they may operate in the absence of one or more of the elements disclosed herein and/or shown in FIGS. 1-22).

Resource management systems provide rich visualizations of projects. The systems streamline processes across selections, procurement, service, and finance, using intelligent caching and proxies that simplify managing remote resources and large data through discrete uses or appointments or a subscription service. The subscription service may provide continuous repair coverages with various benefits such as no assessment fees, faster scheduling, and/or routine maintenance packages at no additional cost, etc. The systems generate graphically rich interactive screens that dynamically render project information over time while guaranteeing cost commitments through invisible mappings. The mappings establish associations between resource addresses for remote sources and remote destinations to local sources through intelligent caches and proxies. The invisible mappings re-direct what is usually served by remote sources via external requests to local sources. The systems create the impression that content is served independently through containers and computer framing, without the delay and bandwidth consumption that usually comes with such technology.

The systems provide alerts and status indicators while providing observations that end-users make electronically. In operation, some end-users have access to projects in their domain through desktop software and mobile apps by the system's knowledge of its users. When access is granted, end-users coordinate services, enter observations, request assessments, establish analytics, track outcomes, quality, and receive guaranteed satisfaction. Access is granted or restricted to user accounts and/or selected files. The system allows the user access to whatever security level is approved and may include the account holder and those privileges granted and authorized by the account holder. An account holder may have full account privileges to perform most, if not all, functions within the system, whereas other users have access to functions associated with the privileges granted by the account holder.

To access objects that render content, connections are usually made between remote resources and local interfaces via remote requests and responses. Establishing network connections for each request/response for materials and services wastes network bandwidth and causes delay as many data exchanges must occur before a request can be serviced. Further when content must be collected from multiple remote resources, some resources include deep link pointers that contain the memory location (address) of embedded content that may be served outside of the network domain. Some linked content is served by remote resources that redirects the user from the user's local environment to compromised external environments not served by the intended-origin server and/or network.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A system that manages remote and local data comprising:
   a declarative client for retrieving data, tracking data loading, and caching data in response to a transmission of database queries from an end-user interface;
   the declarative client accessing an immutable image served by web services of a secure cloud platform;
   a serverless compute engine that receives the immutable image as a template in which a secure container is built and a plurality of tasks that process the immutable image within the secure container;
   an application programming interface that comprises software executed by the declarative client to extract data in response to the database queries from the end-user interface; and a global positioning platform that associates one or more of the plurality of tasks processing the immutable image associated with a plurality of geographic locations;

the global positioning platform generates one or more predictive windows by associating the one or more of the plurality of tasks with one or more of the plurality of geographic locations;

wherein the declarative client includes an in-memory cache that break up results of the database queries into individual objects that are associated with a unique identifier across different directories in a local cache to speed up the execution of the database queries;

wherein the extracted data comprises data extracted from deconstructed downloaded content in which original computer links between data elements are redirected to the downloaded content in a local centralized database.

2. The system of claim 1 further comprising an autogenerated query builder formed by a query generator.

3. The system of claim 2 where the query builder is based on a plurality of home repair application models and a plurality of auto-generated queries comprise a GraphQL service.

4. The system of claim 1 further comprising a payment platform remote from the declarative client that communicates with a plurality of vendor payment services.

5. The system of claim 1 further comprising a payment platform remote from the declarative client and the application programming interface that communicates directly with the interface and the application programming interface that processes external payment services.

6. The system of claim 1 further comprising authentication and authorization servers that generate user pools that configure accessibility rights to the remote and local data.

7. The system of claim 6 where the authentication and authorization servers render a two-way authentication that occurs through a remote end-user's device.

8. The system of claim 1 where the extracted data comprises a home repair service professional referral.

9. The system of claim 1 where acceptance of a referral of a service home repair professional occurs through an end-user's mobile device.

10. The system of claim 1 where acceptance of a quote from a service professional is based on a shared cryptographic secret stored on the system and on an end-user's device.

11. A non-transitory computer-readable storage medium having stored thereon a plurality of software instructions that manages remote and local data, when executed by a hardware processor, causes:

retrieving data and caching data in response to a transmission of database queries from an end-user interface via a declarative client;

the declarative client accessing an immutable image served by web services of a secure private cloud platform;

receiving the immutable image as a template in which a secure container is built and a plurality of tasks that process the immutable image within the secure container via a serverless compute engine; and extracting data via the database queries from the end-user via an application programming interface that comprises a software executed by the declarative client in response to the database queries from the end-user interface;

a global positioning platform that associates one or more of a plurality of tasks processing the immutable image associated with a plurality of geographic locations;

wherein the declarative client includes an cache that stores broken up results of the database queries into individual objects, wherein the objects are each associated with a unique identifier in a local cache to speed up the execution of the database queries;

wherein the extracted data comprises data extracted from deconstructed downloaded content in which original computer assigned links between data elements are mapped to redirected computer links that locate the downloaded content in a database.

12. The non-transitory computer-readable medium of claim 11 further comprising an autogenerated query builder generated by a query generator.

13. The non-transitory computer-readable medium of claim 12 where the query builder serves a homeowner service application that includes an aggregator that aggregates information for users about materials, services, and prices and displays the information through a comparison tool.

14. The non-transitory computer-readable medium of claim 13 where the homeowner service application comprises a subscription service.

15. The non-transitory computer-readable medium of claim 11 further comprising communicating with an application programming interface that processes external payment services.

16. The non-transitory computer-readable medium of claim 11 further comprising communicating with a payment platform that estimates repair ranges.

17. The non-transitory computer-readable medium of claim 16 where the payment platform comprises prescriptive analytics that renders price estimates.

18. The non-transitory computer-readable medium of claim 11 where the extracted data comprises a referral of a service professional.

19. The non-transitory computer-readable medium of claim 11 where an acceptance of a referral of a service professional occurs only electronically through an end-user's mobile device.

20. The non-transitory computer-readable medium of claim 11 where an acceptance of a quote from a service professional is based on a shared cryptographic secret stored on the non-transitory computer-readable medium and on an end-user's device.

* * * * *